(12) United States Patent
Kinukawa et al.

(10) Patent No.: US 11,185,068 B2
(45) Date of Patent: Nov. 30, 2021

(54) DILUENT FOR SPERM AND METHOD FOR PRESERVING SPERM USING SAME

(71) Applicant: Livestock Improvement Association of Japan, Inc., Koto-ku (JP)

(72) Inventors: Masashi Kinukawa, Maebashi (JP); Katsutoshi Funauchi, Maebashi (JP); Kyoko Uchiyama, Maebashi (JP)

(73) Assignee: Livestock Improvement Association of Japan, Inc., Koto-ku (JP)

( * ) Notice: Subject to any disclaimer, the term of this patent is extended or adjusted under 35 U.S.C. 154(b) by 222 days.

(21) Appl. No.: 16/130,022

(22) Filed: Sep. 13, 2018

(65) Prior Publication Data

US 2019/0037833 A1   Feb. 7, 2019

Related U.S. Application Data

(63) Continuation of application No. PCT/JP2017/010439, filed on Mar. 15, 2017.

(30) Foreign Application Priority Data

Mar. 16, 2016   (JP) .............................. JP2016-052899

(51) Int. Cl.
*A61D 19/02* (2006.01)
*A01K 67/02* (2006.01)
(Continued)

(52) U.S. Cl.
CPC .......... *A01N 1/0221* (2013.01); *A01N 1/0284* (2013.01); *A61D 19/02* (2013.01); *A61D 19/024* (2013.01)

(58) Field of Classification Search
CPC .... A01N 1/0221; A01N 1/0284; A61D 19/02; A61D 19/024
See application file for complete search history.

(56) References Cited

U.S. PATENT DOCUMENTS

| 2003/0157475 A1* | 8/2003 | Schenk | A01N 1/0221 435/2 |
| 2013/0062569 A1* | 3/2013 | Mo | A01N 1/0226 252/406 |

(Continued)

FOREIGN PATENT DOCUMENTS

| JP | 5-38284 | 2/1993 |
| JP | 2008-259506 | 10/2008 |

(Continued)

OTHER PUBLICATIONS

Si et al. "Osmotic characteristics and fertility of murine spermatozoa collected in different solutions" Society for Reproduction and Fertility (Year: 2009).*

(Continued)

*Primary Examiner* — Marcia S Noble
*Assistant Examiner* — Lauren K Van Buren
(74) *Attorney, Agent, or Firm* — Element IP, PLC

(57) ABSTRACT

Provided are a diluent and a sperm preservation method using the diluent. The diluent is useful in preservation of sperm with high fertility, and is capable of stably achieving quality control and improving quality of the sperm. Refrigerating or freezing sperm using the diluent for sperm, which includes an aqueous solution containing at least one oligosaccharide selected from the group consisting of a fructo-oligosaccharide, an isomalto-oligosaccharide, a gentio-oligosaccharide, and a galacto-oligosaccharide, can improve the quality of preserved sperm and provide sperm having high fertility, at a reduced cost.

18 Claims, 14 Drawing Sheets

(51) Int. Cl.
*C12N 5/076* (2010.01)
*A01N 1/02* (2006.01)

(56) References Cited

U.S. PATENT DOCUMENTS

| | | | | |
|---|---|---|---|---|
| 2013/0267771 | A1* | 10/2013 | Uchiyama | A61D 19/024 600/35 |
| 2015/0320031 | A1 | 11/2015 | Andreasen et al. | |

FOREIGN PATENT DOCUMENTS

| | | |
|---|---|---|
| JP | 2013-78272 | 5/2013 |
| JP | 5738314 | 6/2015 |
| JP | WO2015/137466 A1 | 9/2015 |
| JP | 2015-171346 | 10/2015 |
| JP | 2016-501873 | 1/2016 |
| KR | 10-1399432 | 11/2013 |
| WO | WO 2012/074060 A1 | 6/2012 |
| WO | WO-2014083169 A1 * | 6/2014 ............ A01N 1/0221 |

OTHER PUBLICATIONS

Masuda et al. "Effects of Fructo-Oligosaccharides on Survival and Acrosome Morphology of Frozen thawed Boar Spermatoza" The Japanese Journal of Swine Science, 1993, 5 pages, full translation accomplished by PTO (Year: 1993).*

Vidal "Soybean lecithin-based extender as an alternative for goat sperm cryopreservation" Small Ruminant Research 109, (2013) 47-51 (Year: 2013).*

International Search Report dated Jun. 20, 2017 in PCT/JP2017/010439, filed on Mar. 15, 2017 (with English translation).

Masuda, H. et al. "Effects of Fructo-Oligosaccharides on Survival and Acrosome Morphology of Frozen-Thawed Boar Spermatozoa", The Japanese Journal of Swine Science ,1993, 5 pages ( with partial Translation).

Masuda, H. "Recent Knowledge on Freezing of Semen of Domestic Animals and Poultry", Japanese Journal of Embryo Transfer, 1996, 8 pages.

"Conception Survey Results", Livestock Improvement Association of Japan, 2013, 54 pages.

"Manual for Artificial Insemination of Cattle", Japan Livestock Technology Association, 2003, 166 pages.

Guthrie, H. D. et al. "Osmotic Tolerance Limits and Effects of Cryprotectants on Motility of Bovine Spermatozoa", Biology of Reproduction 67, 2002, 6 pages.

Hiroshi Masuda et al, "Effects of Fructo-Oligosaccharides on Survival and Acrosome Morphology of Frozen-Thawed Boar Spermatozoa", Japanese Journal of Swine Science, 30, Mar. 1, 1993, 8 pages (submitting English translation only, reference previously on Apr. 1, 2021).

* cited by examiner

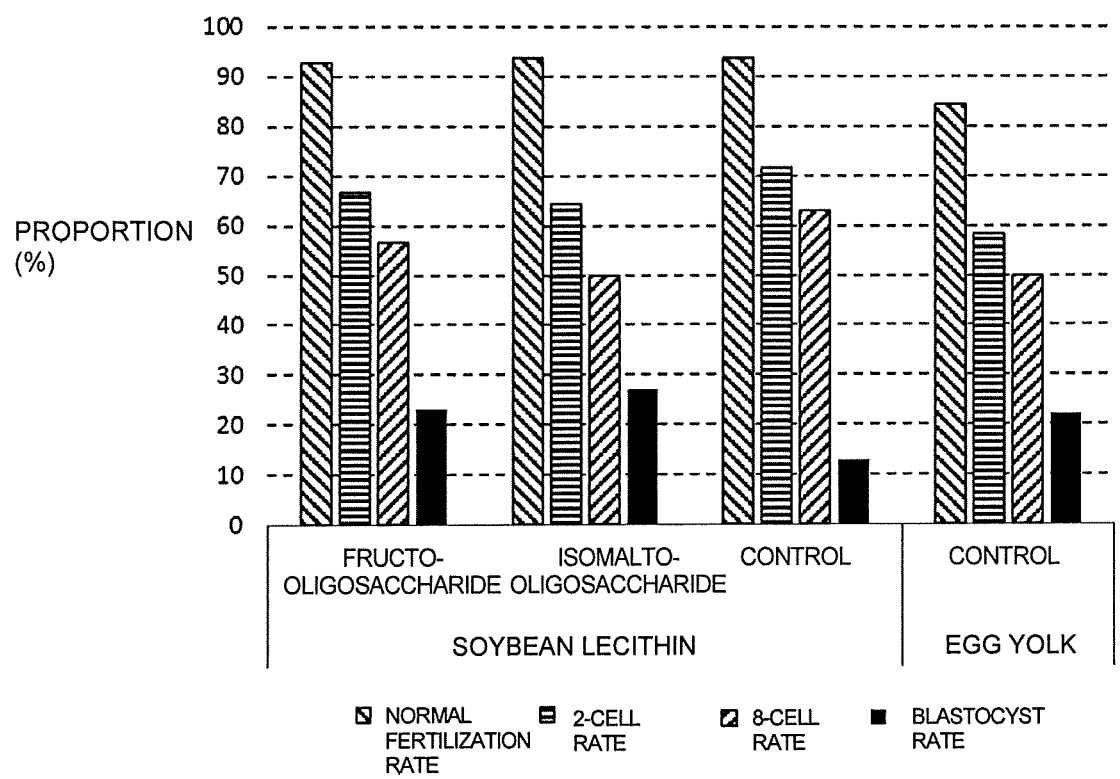

DILUENT FOR SPERM AND METHOD FOR PRESERVING SPERM USING SAME

CROSS-REFERENCE TO RELATED APPLICATIONS

This application is a Continuation of PCT/JP2017/010439, which was filed on Mar. 15, 2017, and claims priority to Japanese Application No. 2016-052899, which was filed on Mar. 16, 2016.

TECHNICAL FIELD

The present invention relates to a diluent for sperm and a sperm preservation method using the diluent.

BACKGROUND ART

Sperm is preserved for efficient breeding and reproduction of livestock, conservation of endangered animal species, infertility treatment, and the like. In general, sperm is diluted with a diluent in order to suppress its motility and metabolism. The diluted sperm is then refrigerated or frozen to be preserved at low temperature. It is considered that the difference in preservation method influences the quality of sperm, resulting in enhancement or deterioration of capacitation and fertility.

For example, from the viewpoint of efficient production and breeding of livestock, almost 100% of the cattle breeding in Japan is carried out by artificial insemination. However, the conception rate of artificial insemination of cattle has been decreasing year by year. For example, with respect to dairy cattle, the conception rate after first insemination was 62.4% and the conception rate after 1 to 3 inseminations was 62.0% in 1989, whereas in 2013, the conception rate after first insemination decreased to 44.3% and the conception rate after 1 to 3 inseminations decreased to 44.1% (Non-Patent Document 1). In order to solve such problems, studies have been conducted on techniques for improving the quality of sperm and increasing the conception rate (Patent Document 1, Non-Patent Document 2).

Attempts to improve the quality of sperm by improvement of the composition of a diluent have also been made (Patent Documents 2 to 4). However, these improvements have been found to be insufficiently effective in increasing the field conception rate. In addition, some of the diluents of the known art contain expensive reagents such as raffinose. Therefore, not only the improvement of quality of sperm, but also reduction in costs is now desired.

PRIOR ART DOCUMENTS

Patent Documents

Patent Document 1: Japanese Patent No. 5738314
Patent Document 2: JP-A-2008-259506
Patent Document 3: JP-A-2013-78272
Patent Document 4: JP-A-2015-171346
Patent Document 5: WO2015/137466

Non-Patent Documents

Non-Patent Document 1: Livestock Improvement Association of Japan, 2013 Conception Survey Results (March 2015)

Non-patent document 2: Japan Livestock Technology Association, Manual for Artificial Insemination of Cattle (March 2003)

Non-Patent Document 3: Guthrie et al., Biology of Reproduction 67, 1811-1816 (2002)

DISCLOSURE OF INVENTION

Technical Problem

It is an object of the present invention to provide a diluent which is capable of improving quality of sperm and reducing costs, and a method for preserving sperm using the diluent.

Solution to the Problem

The present inventors conducted intensive studies on diluents for sperm preservation, from the viewpoints of sperm motility, viability and acrosomal integrity of sperm, the method for examining sperm highly correlating with fertility (the method developed by the present inventors (Patent Document 5)), sperm penetration rate in in-vitro fertilization, conception rate in artificial insemination, and the like. As a result of the studies, the present inventors have made findings that use of an aqueous solution containing at least one oligosaccharide selected from the group consisting of a fructo-oligosaccharide, an isomalto-oligosaccharide, a gentio-oligosaccharide, and a galacto-oligosaccharide significantly improves quality of sperm. The present invention is based on the findings.

Thus, the present invention encompasses the following aspects:

[1] A diluent for sperm, the diluent comprising: an aqueous solution containing at least one oligosaccharide selected from the group consisting of a fructo-oligosaccharide, an isomalto-oligosaccharide, a gentio-oligosaccharide and a galacto-oligosaccharide.

[2] The diluent for sperm according to [1], wherein the oligosaccharide is the fructo-oligosaccharide or the isomalto-oligosaccharide.

[3] The diluent for sperm according to [1] or [2], wherein the aqueous solution contains lecithin, egg yolk or milk.

[4] The diluent for sperm according to [3], wherein the lecithin is soybean lecithin.

[5] The diluent for sperm according to [3] or [4], wherein the egg yolk is derived from a chicken.

[6] The diluent for sperm according to any one of [3] to [5], wherein the milk is cow's milk.

[7] The diluent for sperm according to any one of [1] to [6], wherein the aqueous solution has a pH of from 5.6 to 8.0.

[8] The diluent for sperm according to [7], wherein the aqueous solution has a pH of from 6.2 to 7.0.

[9] The diluent for sperm according to [8], wherein the aqueous solution has a pH from 6.4 to 6.8.

[10] The diluent for sperm according to any one of [1] to [9], wherein the aqueous solution has an osmotic pressure of from 230 to 3414 mmol/kg.

[11] The diluent for sperm according to [10], wherein the aqueous solution has an osmotic pressure of from 1199 to 1809 mmol/kg.

[12] The diluent for sperm according to [11], wherein the aqueous solution has an osmotic pressure of from 1247 to 1575 mmol/kg.

[13] The diluent for sperm according to any one of [1] to [12], wherein the oligosaccharide is contained at a concentration of from 20 to 40 g/L (w/v).

[14] The diluent for sperm according to [13], wherein the oligosaccharide is contained at a concentration of from 25 to 35 g/L (w/v).
[15] The diluent for sperm according to any one of [1] to [14], wherein 1-kestose, nystose, or 1-fructofuranosyl nystose is contained as the fructo-oligosaccharide.
[16] The diluent for sperm according to any one of [1] to [15], wherein isomaltose, isomaltotriose or panose is contained as the isomalto-oligosaccharide.
[17] The diluent for sperm according to any one of [1] to [16], wherein gentiobiose, gentiotriose or gentiotetraose is contained as the gentio-oligosaccharide.
[18] The diluent for sperm according to any one of [1] to [17], wherein 4'-galactosyl lactose is contained as the galacto-oligosaccharide.
[19] The diluent for sperm according to any one of [1] to [18], wherein tris(hydroxymethyl)aminomethane or citric acid is contained as a buffer.
[20] The diluent for sperm according to any one of [1] to [19], wherein glycerin, ethylene glycol, propylene glycol or dimethyl sulfoxide is contained as a cryoprotectant.
[21] The diluent for sperm according to any one of [1] to [20], wherein the cryoprotectant is contained at a concentration of from 6.5 to 7.5%.
[22] A diluted sperm solution including: the diluent for sperm as defined in any one of [1] to [21]; and sperm derived from a non-human mammal.
[23] A straw for artificial insemination, the straw including: the diluted sperm solution as defined in [22]; and a straw.
[24] A sperm preservation method including refrigerating or freezing sperm using the diluent as defined in any one of [1] to [21].
[25] A sperm preservation method including refrigerating or freezing the diluted sperm solution as defined in [22].

Advantageous Effects of Invention

According to the present invention, use of a diluent containing at least one oligosaccharide selected from the group consisting of a fructo-oligosaccharide, an isomalto-oligosaccharide, a gentio-oligosaccharide and a galacto-oligosaccharide is used for preserving sperm, enabling improvement of quality of the preserved sperm and provision of the sperm having high fertility. In addition, the diluent for sperm of the present invention is produced at a lower cost than the conventional diluents.

Table 1 below shows prices of diluents of the present invention, each containing a fructo-oligosaccharide, an iso- malto-oligosaccharide, a gentio-oligosaccharide, or a galacto-oligosaccharide, and the price of a diluent containing raffinose (the known art). The prices are shown according to reagents. Each of the shown prices is of per 1 liter of diluent, calculated through conversion based on search results on the homepage of Wako Pure Chemical Industries, Ltd. (http://www.siyaku.com/). Use of a fructo-oligosaccharide, an isomalto-oligosaccharide, a gentio-oligosaccharide, or a galacto-oligosaccharide for a diluent reduces the costs by 1000 yen or more per 1 liter of diluent, i.e., by about 40% or more, as compared to use of simple raffinose for a diluent.

TABLE 1

|  | Raffinose (Known art) | Fructo-Oligosaccharide | Isomalto-Oligosaccharide | Gentio-Oligosaccharide | Galacto-Oligosaccharide |
| --- | --- | --- | --- | --- | --- |
| Tris(hydroxymethyl) aminomethane | 119 | 119 | 119 | 119 | 119 |
| Citric Acid | 18 | 18 | 18 | 18 | 18 |
| Trisodium Citrate | 9 | 9 | 9 | 9 | 9 |
| Lactose | 104 | 104 | 104 | 104 | 104 |
| Fructose | 17 | 17 | 17 | 17 | 17 |
| Penicillin G Potassium | 212 | 212 | 212 | 212 | 212 |
| Streptomycin | 376 | 376 | 376 | 376 | 376 |
| Soybean Lecithin | 80 | 80 | 80 | 80 | 80 |
| Glycerin | 139 | 139 | 139 | 139 | 139 |
| Oligosaccharide or Raffinose | 1,674 | 509 | 663 | 579 | 544 |
| Total | 2,747 | 1,583 | 1,736 | 1,652 | 1,617 Unit (yen) |

BRIEF DESCRIPTION OF DRAWINGS

In FIGS. 1A to 4C, L stands for soybean lecithin and E stands for egg yolk. Each value within parentheses represents the pH of the respective diluent.

FIG. 4C is a graph showing a proportion of bovine sperm having a VCL of 200 μm/sec. or more with respect to thawed bovine sperm, wherein the bovine sperm was cryopreserved after being diluted with a respective diluent containing a galacto-oligosaccharide and having a different pH (within the range of from 6.6 to 7.4). The shown values represent average values (n=8).

FIG. 9 is a graph showing a penetration rate of thawed bovine sperm in in-vitro fertilization test, wherein the bovine sperm was cryopreserved after being diluted with a respective diluent containing a fructo-oligosaccharide or an isomalto-oligosaccharide. It is shown that the penetration rate of sperm of the each test group is substantially as high as that of the control group.

DESCRIPTION OF EMBODIMENTS

Figure 1A:
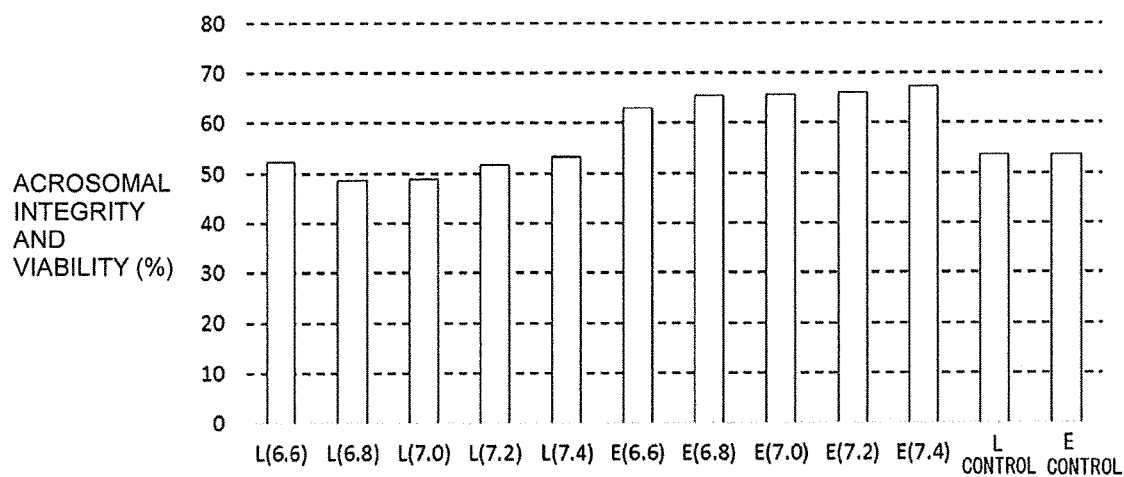
FIG. 1A is a graph showing acrosomal integrity and viability (%) of thawed bovine sperm, wherein the bovine sperm was cryopreserved after being diluted with a respective diluent containing a fructo-oligosaccharide and having a different pH (within the range of from 6.6 to 7.4). The shown values represent average values (n=6).

The present invention relates to a diluent for sperm, the diluent containing at least one oligosaccharide selected from the group consisting of a fructo-oligosaccharide, an isomalto-oligosaccharide, a gentio-oligosaccharide and a galacto-oligosaccharide. The present invention also relates to a method for preserving sperm by using the diluent for sperm.

An oligosaccharide is a saccharide containing about 2 to 20 monosaccharides bound through glycosidic linkage, and having a molecular weight approximately ranging from 300 to 3000. The oligosaccharide is produced by, for example, extraction from a natural ingredient, hydrolysis of polysaccharides with an enzyme, synthesis through transglycosylation reaction or condensation reaction of a raw material such as starch or saccharides, and isomerization by an enzyme or chemical reduction. The oligosaccharide undergoes purification, concentration, fractionation, crystallization, drying, and the like, during the production process.

An oligosaccharide for use in the diluent for sperm of the present invention is at least one oligosaccharide selected from the group consisting of a fructo-oligosaccharide, an isomalto-oligosaccharide, a gentio-oligosaccharide and a galacto-oligosaccharide. For example, the oligosaccharide for use in the present invention may be a simple fructo-oligosaccharide, a simple isomalto-oligosaccharide, a mixture of a fructo-oligosaccharide and an isomalto-oligosaccharide, or a mixture of a fructo-oligosaccharide, an isomalto-oligosaccharide, and a galacto-oligosaccharide.

In the diluent for sperm, the oligosaccharide is contained preferably at a concentration of from 20 to 40 g/L (w/v), and more preferably at a concentration of from 25 to 35 g/L (w/v).

The fructo-oligosaccharide is a generic name for oligosaccharides having a structure in which a plurality of fructose units is bound to a fructose residue of sucrose. Examples of the fructo-oligosaccharide include 1-kestose, nystose, and 1-fructofuranosyl nystose. For example, the fructo-oligosaccharide is produced by allowing β-fructosyl furanosidase to act on sucrose that is a raw material.

The isomalto-oligosaccharide is a generic name for oligosaccharides in which a plurality of glucoses contains at least one α-1,2-bond, at least one α-1,3-bond, or at least one α-1,4-bond. Examples of the isomalto-oligosaccharide include isomaltose, isomaltotriose, isomaltotetraose, and panose. For example, the isomalto-oligosaccharide is produced by allowing α-amylase, ρ-amylase, or α-glucosidase to act on starch that is a raw material.

The gentio-oligosaccharide is a generic name for oligosaccharides including a plurality of glucoses bound through β-1,6-glucosidic linkage. Examples of the gentio-oligosaccharide include gentiobiose, gentiotriose, and gentiotetraose. For example, the gentio-oligosaccharide is produced by allowing β-glucosidase to act on glucose that is a raw material.

The galacto-oligosaccharide is a generic name for oligosaccharides produced by subjecting lactose to enzyme treatment. Examples of the galacto-oligosaccharide include 4'-galactosyl lactose. For example, the galacto-oligosaccharide is produced by allowing β-galactosidase to act on lactose that is a raw material.

The present invention is applicable to sperm derived from any animal. Examples of the animal include any mammals including humans, livestock animals, pet animals, zoo animals, experimental animals, and wild animals. Examples of the livestock animals include cows, buffalos, pigs, goats, horses, and sheep. Examples of the pet animals include dogs, cats, and rabbits. Examples of the zoo animals include endangered species animals such as pandas. Examples of the experimental animals include mice, hamsters, rats, sea urchins, and starfish. The sperm for the present invention may be derived from any source such as a testis, an epididymis, ejaculated semen, stem cells, testicular stem cells, ES cells, iPS cells, or cultured cells. Examples of methods of collecting sperm include: a method of harvesting a testis and aspirating sperm in the case of sperm derived from the testis; a method of aspirating or scraping out sperm from a cauda epididymis in the case of sperm derived from an epididymis; a method of collecting sperm that has been ejaculated into a female body or a method of collecting sperm using electrical stimulation or an artificial vagina in the case of sperm derived from ejaculated semen; and a method of collecting sperm through cell culturing in the case of sperm derived from stem cells, testicular stem cells, ES cells, iPS cells, or cultured cells. The sperm may be collected as semen immediately after acquisition, i.e., may be suspended in seminal plasma, or may be provisionally diluted or washed with an arbitrary aqueous solution or the like.

The diluent for sperm of the present invention may contain any substance in addition to at least one oligosaccharide selected from the group consisting of a fructo-oligosaccharide, an isomalto-oligosaccharide, a gentio-oligosaccharide and a galacto-oligosaccharide, as long as the diluent has a desired osmotic pressure and a desired pH. If the sperm is refrigerated to be preserved, the diluent may include a buffer, sugar, egg yolk, lecithin, milk, or an antibiotic, for example. If the sperm is to be cryopreserved, the diluent may include, for example, a buffer, sugar, egg yolk, lecithin, milk, an antibiotic, and a cryoprotectant.

In the present invention, the buffer is used to allow the diluent for sperm to have a desired pH. Any buffer providing buffering action in the vicinity of neutrality may be used. Examples of the buffer include: buffers such as tris(hydroxymethyl)aminomethane, MES, HEPES, TES, and tricine; a phosphate buffer solution; a citrate buffer solution; an acetate buffer solution; and a carbonate buffer solution. Further, acid or alkali can be used in order to adjust the diluent to a desired pH. Examples of the acid include hydrochloric acid, sulfuric acid, phosphoric acid, acetic acid, citric acid, formic acid, gluconic acid, lactic acid, oxalic acid, tartaric acid, and ascorbic acid. Examples of the alkali include alkali metal hydroxides such as sodium hydroxide, potassium hydroxide, calcium hydroxide, sodium carbonate, sodium hydrogencarbonate, potassium carbonate, and potassium hydrogencarbonate.

For example, if tris(hydroxymethyl)aminomethane and citric acid are used as the buffers of the diluent for sperm of the present invention, tris(hydroxymethyl)aminomethane is contained at a concentration of preferably from 50 to 200 mM and more preferably from 80 to 150 mM, while citric acid is contained at a concentration of preferably from 20 to 80 mM, and more preferably from 25 to 60 mM.

In the present invention, sugar is added to the diluent for sperm in order to serve as an energy source for sperm. Examples of the sugar include glucose, fructose, sucrose, and lactose.

For example, if fructose and lactose are used as sugars of the diluent for sperm of the present invention, fructose is contained at a concentration of preferably from 1 to 50 mM and more preferably from 5 to 30 mM, while lactose is contained at a concentration of preferably from 1 to 100 mM, and more preferably from 20 to 60 mM.

For example, if sucrose and lactose are used as sugars of the diluent for sperm of the present invention, sucrose is contained at a concentration of preferably from 10 to 150 mM and more preferably from 30 to 70 mM, while lactose is contained at a concentration of preferably from 10 to 150 mM, and more preferably from 30 to 70 mM.

In the present invention, egg yolk is used in the diluent for sperm in order to improve the ability of sperm to be preserved. For example, the egg yolk may be derived from birds such as a chicken, a quail, and a guinea fowl. The egg yolk is contained at a concentration of preferably from 5 to 35% (v/v), more preferably from 10 to 30% (v/v), and particularly preferably from 15 to 25% (v/v).

In the present invention, lecithin is used in the diluent for sperm in order to improve the ability of sperm to be preserved. For example, lecithin may be derived from soybean, sunflower, or egg yolk. Use of soybean lecithin can solve problems involved in egg yolk-based diluents: difficulty in stable quality control, time- and effort-consuming preparation, high costs, and the risk of intermediation of pathogenic viruses such as avian influenza viruses. The soybean lecithin is contained at a concentration of preferably from 0.15 to 1.0% (w/v), more preferably from 0.2 to 0.4% (w/v), and particularly preferably from 0.25 to 0.35% (w/v).

In the present invention, milk is used in the diluent for sperm in order to improve sperm preservation. For example, the milk may be derived from a cow, a donkey, a goat, a horse, a sheep, or a buffalo. Milk also includes processed milk with some ingredients removed. Examples of the processed milk include low-fat milk containing a small amount of fat, non-fat milk with fat removed, and an aqueous solution of dried skim milk powder.

An antibiotic is used in the diluent for sperm of the present invention for the purpose of preventing bacterial proliferation. Examples of the antibiotic include penicillin, streptomycin, gentamicin, and dibekacin.

A cryoprotectant is used in the diluent for sperm of the present invention in order to improve the freeze tolerance of sperm. Examples of the cryoprotectant include glycerin, ethylene glycol, propylene glycol, and dimethyl sulfoxide.

The diluent for sperm according to the present invention include a primary diluent which contains no cryoprotectant and a secondary diluent which contains a cryoprotectant. However, a diluent containing any cryoprotectant may be used as long as the diluent has a desired cryoprotectant concentration at the time of the final dilution. It is also possible to dilute semen only once such that the thus diluted semen contains the cryoprotectant at the final concentration.

If glycerin is used as the cryoprotectant for the diluent for sperm of the present invention, glycerin is contained at a concentration of preferably from 5.0 to 8.5% (v/v), more preferably from 6.0 to 8.0% (v/v), and particularly preferably from 6.5 to 7.5% (v/v).

The pH of the diluent for sperm of the present invention is adjusted using one or a plurality of buffers, acids or alkalis. The diluent is used preferably within the pH range of from 5.0 to 9.0, and more preferably within the pH range of from 5.6 to 8.0. The diluent is used still more preferably within the pH range of from 6.2 to 7.0. The diluent is used particularly preferably within the pH range of from 6.4 to 6.8. The pH is measured with a pH meter.

The diluent for sperm of the present invention may have any osmotic pressure as long as the sperm can maintain the movement activity and fertilization activity. However, the osmotic pressure is usually set to be from 230 to 3414 mmol/kg. The lower limit of 230 mmol/kg is specified in the Non-Patent Document 3 as the lower limit value of a range in which sperm can maintain movement activity. The upper limit of 3414 mmol/kg is the osmotic pressure of the secondary diluent, and specified as the upper limit value of a range in which sperm can maintain the movement activity in the case where the secondary diluent is mixed with the primary diluent at the time of cryopreservation. Although a theoretical value of osmotic pressure can be calculated from a solute concentration, degree of dissociation, and the like, the osmotic pressure is measured using an osmotic pressure meter (osmometer) in consideration of, for example, the interaction of substances constituting the solution.

Based on the description of Non-Patent Document 3, the osmotic pressure of the primary diluent of the present invention is from 230 to 400 mmol/kg, more preferably from 250 to 350 mmol/kg, and particularly preferably from 260 to 330 mmol/kg.

The osmotic pressure of the secondary diluent of the present invention is from 2152 to 3414 mmol/kg, and more preferably from 2349 to 2957 mmol/kg. Cryopreserved semen has, immediately after being thawed, an osmotic pressure of preferably from 1199 to 1809 mmol/kg, and more preferably from 1247 to 1575 mmol/kg.

A method for preserving sperm according to the present invention includes: suspending sperm in the diluent described above; and refrigerating or cryopreserving the sperm. Refrigeration of sperm means to preserve sperm at a temperature of 18° C. or below, the temperature being low to the extent that the sperm is not frozen. Cryopreservation of sperm means to freeze and preserve sperm that has been diluted with the diluent of the present invention containing a cryoprotectant. For example, cryopreservation of bovine sperm is performed according to the method of Non-Patent Document 2.

The diluent for sperm of the present invention and the method for preserving sperm using the diluent will be described in further detail with reference to Examples. It should be understood that the present invention is by no means limited to the following examples, and ordinary modifications of the technical field to which the present invention belongs may be made to the present invention.

Example 1: Exemplary Preparation of Diluent

A mixture of 12.1 g of tris(hydroxymethyl)aminomethane (Wako Pure Chemical Industries, Ltd.), 7.1 g of citric acid monohydrate (Wako Pure Chemical Industries, Ltd.), 1.8 g of trisodium citrate dihydrate (Wako Pure Chemical Industries, Ltd.), 30.0 g of fructo-oligosaccharide (Wako Pure Chemical Industries, Ltd.), 14.4 g of lactose (Wako Pure Chemical Industries, Ltd.), 3.6 g of fructose (Wako Pure Chemical Corporation), 600,000 U of penicillin G potassium (Banyu Pharmaceutical Co., Ltd.), 0.6 g (titer) of streptomycin (Meiji Seika Kaisha, Ltd.), and 3.0 g of soybean lecithin (Wako Pure Chemical Industries, Ltd.) was prepared. The resultant mixture was diluted with distilled water to 860 ml total in a measuring flask, thereby obtaining a primary diluent. A second diluent was obtained by adding 140 ml of glycerin (Wako Pure Chemical Industries, Ltd.) to the primary diluent. An osmotic pressure was measured with Vapor Pressure Osmometer 5520 (Wescor Inc.). The osmotic pressure of the primary dilution was 289 mmol/kg at 25° C., and the osmotic pressure of the secondary diluent was 2709 mmol/kg at 25° C. A pH was measured with a pH meter (HORIBA, Ltd.). The pH of the primary diluent was 6.5 at 25° C., and the pH of the secondary diluent was 6.6 at 25° C.

Example 2: Exemplary Preparation of Frozen Semen

Semen collected from a breeding bull kept at Livestock Improvement Association of Japan was diluted with the primary diluent of Example 1 so that the diluted semen contained 100 million sperm per ml. The semen diluted with the primary diluent was further diluted with the secondary diluent by conventional methods so that the final concentration of glycerin was 7.0% and the diluted semen contains 50 million sperm per ml. The diluted semen was allowed to stand still at 4° C. for 5 hours from the start of dilution to freezing. The secondarily diluted sperm was poured in plastic straws with a cotton plug (FUJIHIRA INDUSTRY CO., LTD; 0.5 ml, medium, 133), and the inlets of the straws were sealed by thermocompression bonding, thereby preparing straws for artificial insemination. The straws for artificial insemination were frozen in liquid nitrogen vapor by conventional methods, and preserved in liquid nitrogen. With the cryopreservation carried out in this manner, the quality of sperm was maintained in a good state semipermanently.

Example 3. Quality of Frozen Semen Prepared by Using Diluent Containing Fructo-Oligosaccharide Semen collected from a breeding bull kept at Livestock Improvement Association of Japan was diluted with the primary and secondary diluents of Example 1 described above, of which the pH was adjusted from 6.6 to 7.4 in 0.2 increments by using acid or alkali, so that the final concentration of glycerin was 7%, thereby obtaining diluted sperm solutions. As a control group with soybean lecithin but no fructo-oligosaccharide, semen was diluted with a diluent described in Example 1 of Patent Document 4, the diluent having a final glycerin concentration of 7% (L control). As a control group with egg yolk but no fructo-oligosaccharide, semen was diluted with a diluent described in Patent Document 1, produced and sold by Livestock Improvement Association of Japan for preparation of frozen semen, the diluent having a final glycerin concentration of 6.5% (E control). Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were then prepared by conventional methods. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. The quality of the semen was examined.

The proportion of viable sperm having acrosomal integrity was confirmed by the following method. Washed sperm was adjusted to 10 million/ml. Following addition of 2 µg/ml of PI (Sigma) and 2 µg/ml of PNA-FITC (Sigma) thereto, the sperm was incubated at 25° C. for 10 minutes. Using a flow cytometer (Cell Lab QuantaSC, Beckman), 20,000 sperm were examined for each sample. Sperm not stained with PI was determined as viable sperm, and sperm not stained with PNA-FITC was determined as sperm having acrosomal integrity. The proportion of viable sperm having acrosomal integrity was determined. FIG. 1A shows the results. The test groups with the diluents containing the fructo-oligosaccharide showed values equivalent to or higher than those of the control groups. In particular, use of egg yolk resulted in a high rate of viability and acrosomal integrity.

Figure 1B:
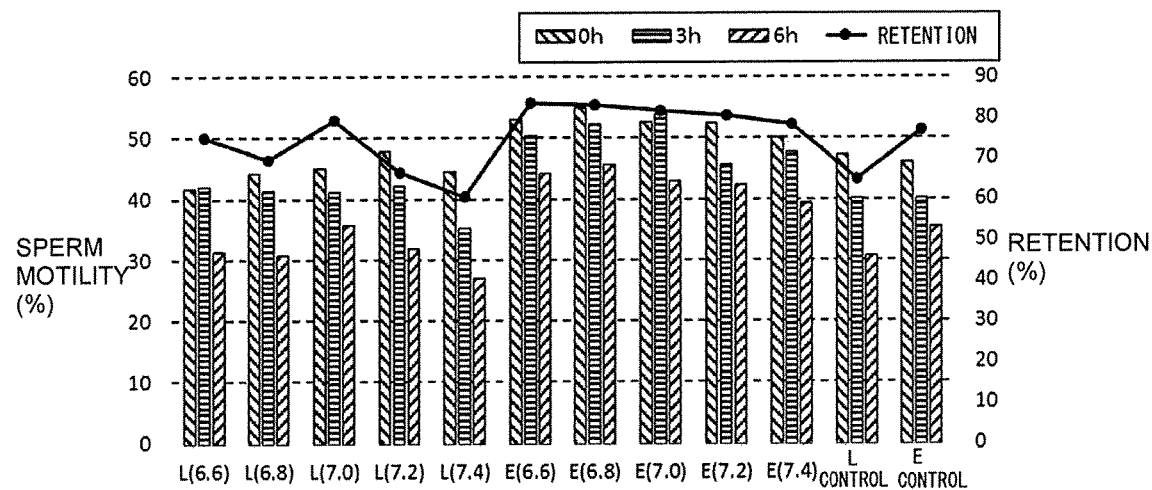
FIG. 1B is a graph showing sperm motility (%) and retention (%) of thawed bovine sperm, wherein the bovine sperm was cryopreserved after being diluted with a respective diluent containing a fructo-oligosaccharide and having a different pH (within the range of from 6.6 to 7.4). The shown values represent average values (n=6).

The sperm motility was examined by the following method. The sperm motility was measured using a sperm motility analyzer "Ceros" (Hamilton Thorne) at 38° C. A proportion of sperm moved a distance of 50 µm or more in one second (sperm motility (%)) was determined. The measurement was conducted immediately after the sperm washing (0 h), at three hours after the incubation (3 h), and at six hours after the incubation (6 h). A retention of sperm motility is described as (sperm motility at six hours)/(sperm motility immediately after washing). FIG. 1B shows the results. The test groups with the diluents containing the fructo-oligosaccharide showed values equivalent to or higher than those of the control groups. In particular, use of egg yolk resulted in high sperm motility.

Figure 1C:
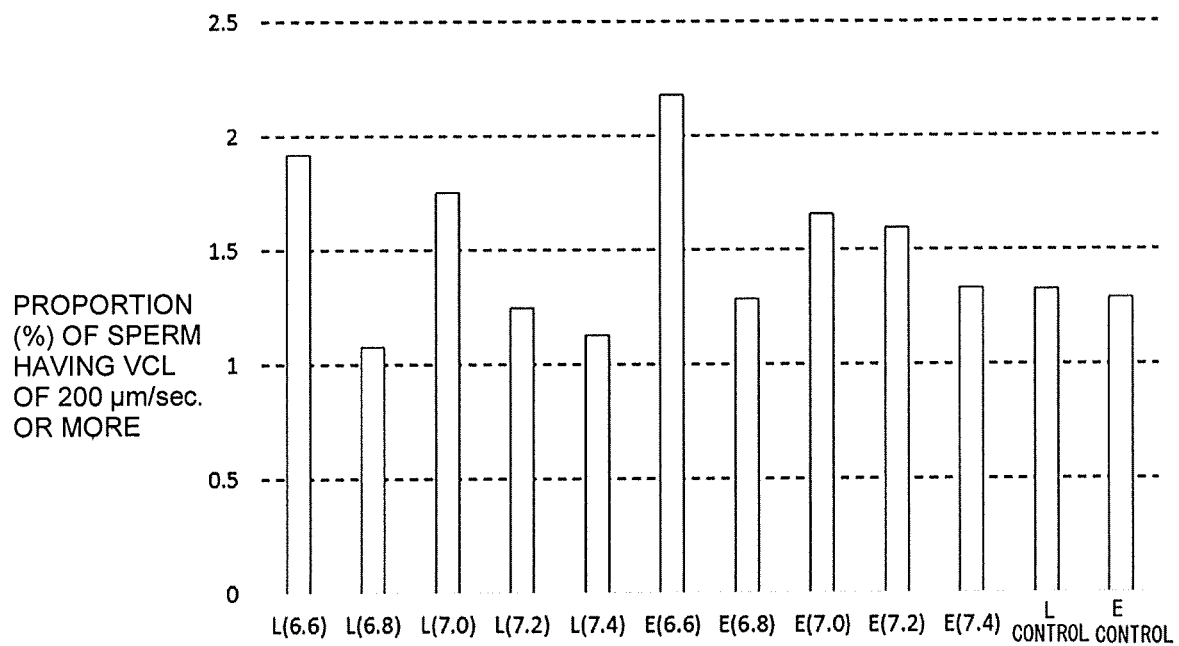
FIG. 1C is a graph showing a proportion of bovine sperm having a VCL of 200 μm/sec. or more (Sperm VCL more than 200 μm/s (%)) with respect to thawed bovine sperm, wherein the bovine sperm was cryopreserved after being diluted with a respective diluent containing a fructo-oligosaccharide and having a different pH (within the range of from 6.6 to 7.4). The shown values represent average values (n=6).

Sperm highly correlating with fertility was examined by the following method. Following addition of 250 µl of an inspection liquid described in Patent document 5 per 10 million sperm, the sperm was incubated at 38° C. for 10 minutes. An equal volume of the inspection liquid containing 4% (w/v) polyvinyl pyrolidone K-90 (Wako Pure Chemical Industries, Ltd.) was mixed with the sperm. The mixture was dropped into a slide chamber (Leja B. V.) pre-warmed to 38° C. and having a thickness of 20 µm, and measured using the sperm motility analyzer, Ceros (Hamilton Thorne, Inc.) at an imaging speed of 1/60 sec. In this manner, a proportion of sperm having a VCL of 200 µm/sec. or more highly correlating with fertility was analyzed. VCL indicates curvilinear velocity and is described in FIG. 1 of Patent-Document 5 (WO2015/137466). FIG. 1C shows the results. The test groups with the diluents containing the fructo-oligosaccharide showed values equivalent to or higher than those of the control groups. In particular, in the group having a pH of 6.6, the proportion of sperm having a VCL of 200 µm/sec. or more was high.

Example 4. Quality of Frozen Semen Prepared by Using Diluent Containing Isomalto-Oligosaccharide Semen collected from a breeding bull kept at Livestock Improvement Association of Japan was diluted with primary and secondary diluents prepared in the same manner as in Example 1 except that the fructo-oligosaccharide was replaced with isomalto-oligosaccharide (Wako Pure Chemical Industries, Ltd.). The pH of the primary and secondary diluents was adjusted to from 6.6 to 7.4 in 0.2 increments by using acid or alkali. The semen was diluted so that the final concentration of glycerin was 7%, thereby obtaining diluted sperm solutions. As a control group with soybean lecithin but no isomalto-oligosaccharide, semen was diluted with the diluent described in Example 1 of Patent Document 4, the diluent having a final glycerin concentration of 7% (L control). As a control group with egg yolk but no isomalto-oligosaccharide, semen was diluted with the diluent described in Patent Document 1, produced and sold by Livestock Improvement Association of Japan for preparation of frozen semen, the diluent having a final glycerin concentration of 6.5% (E control). Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were then prepared by conventional methods. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. The quality of the semen was examined.

Figure 2A:
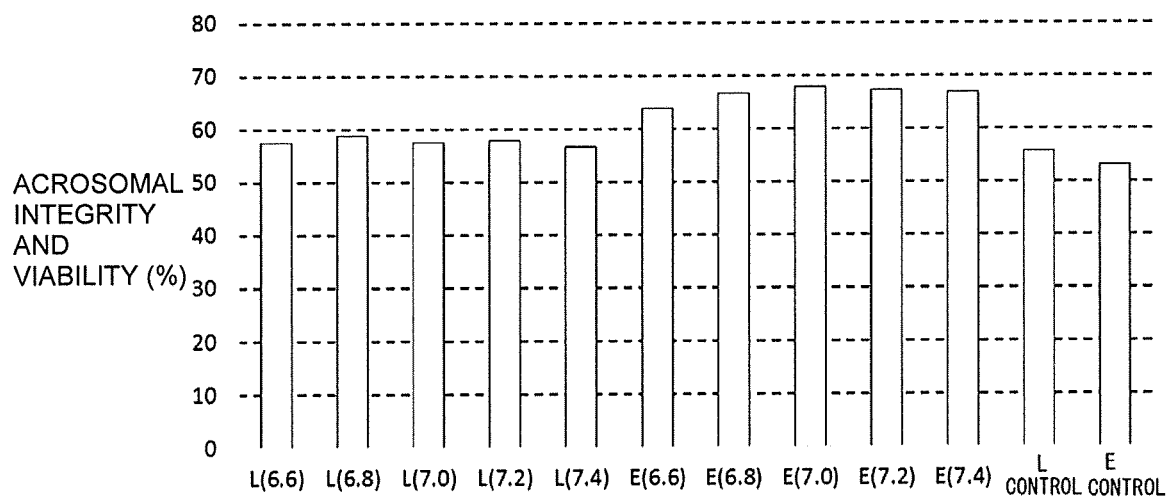
FIG. 2A is a graph showing acrosomal integrity and viability (%) of thawed bovine sperm, wherein the bovine sperm was cryopreserved after being diluted with a respective diluent containing an isomalto-oligosaccharide and having a different pH (within the range of from 6.6 to 7.4). The shown values represent average values (n=6).
Figure 2B:
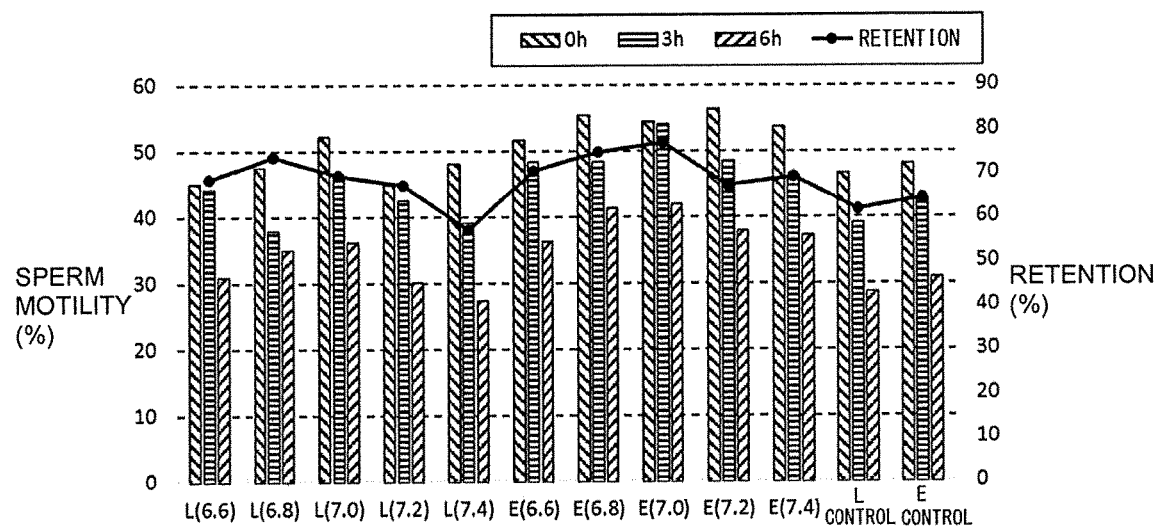
FIG. 2B is a graph showing sperm motility and retention of thawed bovine sperm, wherein the bovine sperm was cryopreserved after being diluted with a respective diluent containing an isomalto-oligosaccharide and having a different pH (within the range of from 6.6 to 7.4). The shown values represent average values (n=6).
Figure 2C:
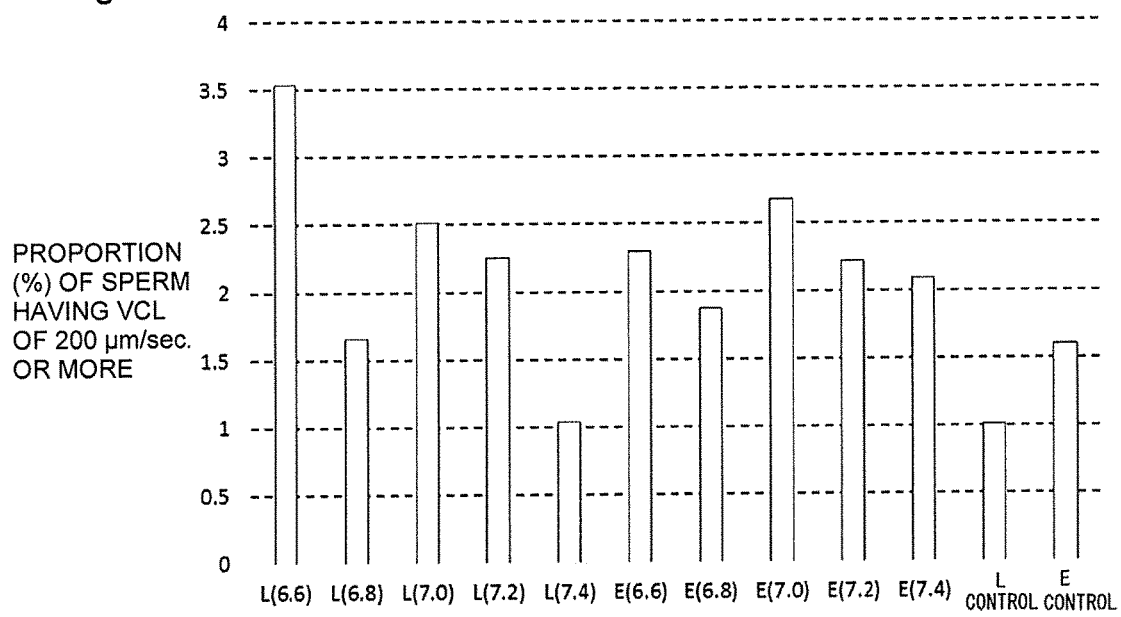
FIG. 2C is a graph showing a proportion of bovine sperm having a VCL of 200 μm/sec. or more with respect to thawed bovine sperm, wherein the bovine sperm was cryopreserved after being diluted with a respective diluent containing an isomalto-oligosaccharide and having a different pH (within the range of from 6.6 to 7.4). The shown values represent average values (n=6).

The proportion of viable sperm having acrosomal integrity (FIG. 2A), sperm motility (FIG. 2B), and sperm highly correlating with fertility (FIG. 2C) were examined in the same manner as in Example 3. The test groups with the diluents containing isomalto-oligosaccharide showed values equivalent to or higher than those of the control groups. In particular, use of egg yolk resulted in a high rate of viability and acrosomal integrity and high sperm motility. The proportion of sperm having a VCL of 200 µm/sec. or more was high in the groups within the pH range from 6.6 to 7.2.

Example 5. Quality of Frozen Semen Prepared by Using Diluent Containing Gentio-Oligosaccharide Semen collected from a breeding bull kept at Livestock Improvement Association of Japan was diluted with primary and secondary diluents prepared in the same manner as in Example 1 except that the fructo-oligosaccharide was replaced with gentio-oligosaccharide (Wako Pure Chemical Industries, Ltd.). The pH of the primary and secondary diluents was adjusted to from 6.6 to 7.4 in 0.2 increments by using acid or alkali. The semen was diluted so that the final concentration of glycerin was 7%, thereby obtaining diluted sperm solutions. As a control group with soybean lecithin but no gentio-oligosaccharide, semen was diluted with the diluent described in Example 1 of Patent Document 4, the diluent having a final glycerin concentration of 7% (L control). As a control group with egg yolk but no gentio-oligosaccharide, semen was diluted with the diluent described in Patent Document 1, produced and sold by Livestock Improvement Association of Japan for preparation of frozen semen, the diluent having a final glycerin concentration of 6.5% (E control). Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were prepared by conventional methods. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. The quality of the semen was examined.

Figure 3A:
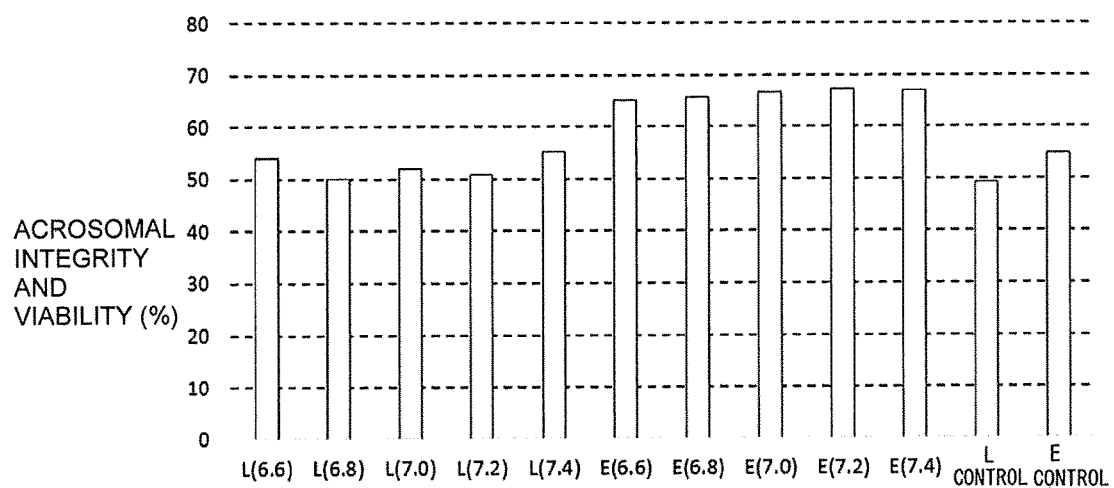
FIG. 3A is a graph showing acrosomal integrity and viability of thawed bovine sperms, wherein the bovine sperm was cryopreserved after being diluted with a respective diluent containing a gentio-oligosaccharide and having a different pH (within the range of from 6.6 to 7.4). The shown values represent average values (n=6).
Figure 3B:
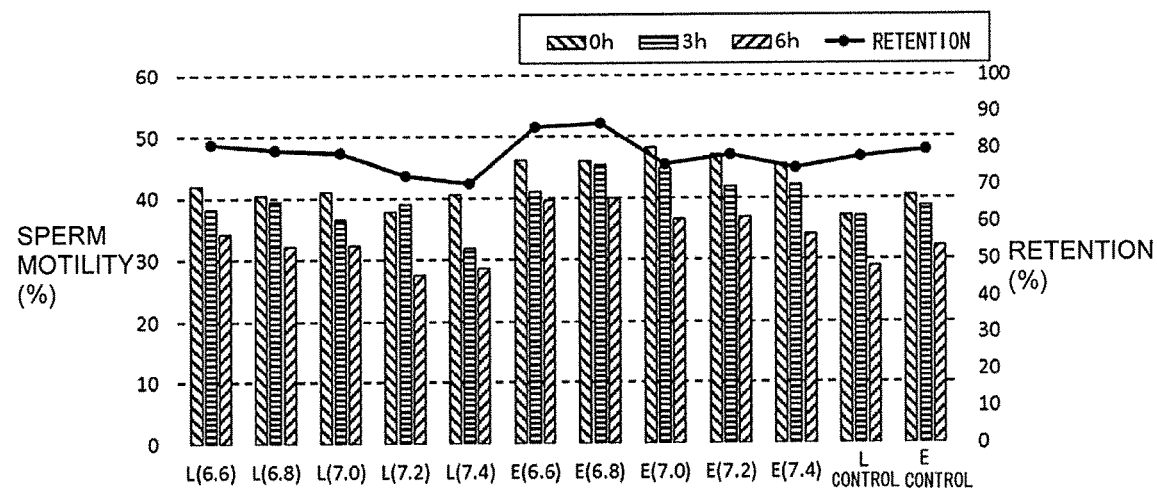
FIG. 3B is a graph showing sperm motility and retention of thawed bovine sperm, wherein the bovine sperm was cryopreserved after being diluted with a respective diluent containing a gentio-oligosaccharide and having a different pH (within the range of from 6.6 to 7.4). The shown values represent average values (n=6).
Figure 3C:
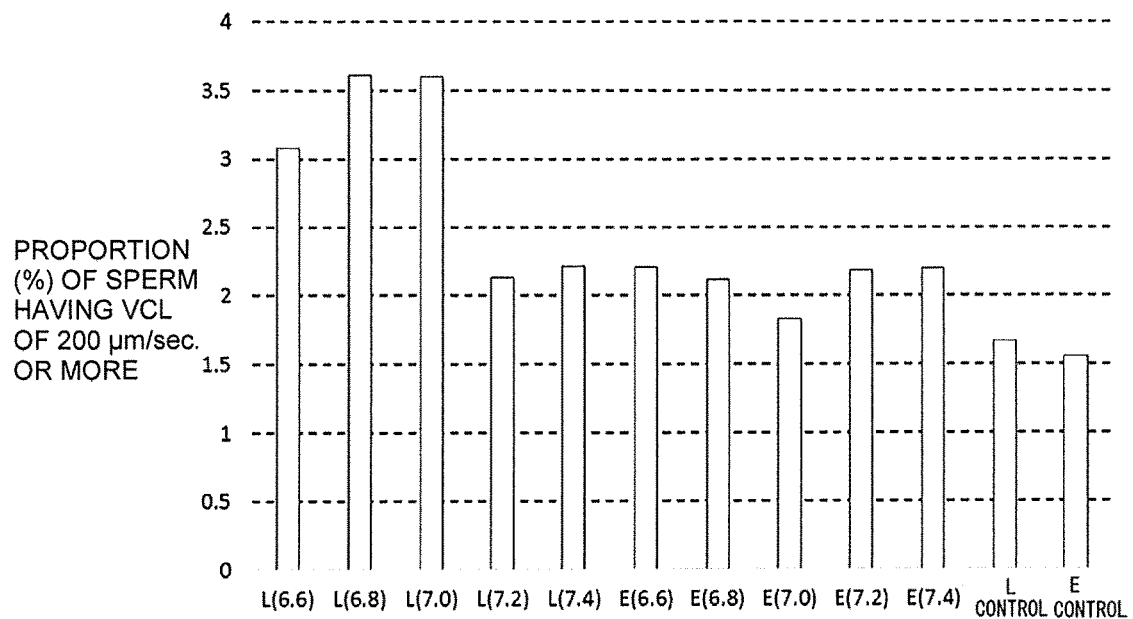
FIG. 3C is a graph showing a proportion of bovine sperm having a VCL of 200 μm/sec. or more with respect to thawed bovine sperm, wherein the bovine sperm was cryopreserved after being diluted with a respective diluent containing a gentio-oligosaccharide and having a different pH (within the range of from 6.6 to 7.4). The shown values represent average values (n=6).

The proportion of viable sperm having acrosomal integrity (FIG. 3A), sperm motility (FIG. 3B), and sperm highly correlating with fertility (FIG. 3C) were examined in the same manner as in Example 3. The test groups with the diluents containing gentio-oligosaccharide showed values equivalent to or higher than those of the control groups. In particular, use of egg yolk resulted in a high rate of viability and acrosomal integrity and high sperm motility. The proportion of sperm having a VCL of 200 µm/sec. or more was high in all the test groups.

Example 6. Quality of Frozen Semen Prepared by Using Diluent Containing Galacto-Oligosaccharide Semen collected from a breeding bull kept at Livestock Improvement Association of Japan was diluted with primary and secondary diluents prepared in the same manner as in Example 1 except that the fructo-oligosaccharide was replaced with galacto-oligosaccharide (Wako Pure Chemical Industries, Ltd.). The pH of the primary and secondary diluents was adjusted to from 6.6 to 7.4 in 0.2 increments by using acid or alkali. The semen was diluted so that the final concentration of glycerin was 7%, thereby obtaining diluted sperm solutions. As a control group with soybean lecithin but not galacto-oligosaccharide, semen was diluted with the diluent described in Example 1 of Patent Document 4, the diluent having a final glycerin concentration of 7% (L control). As a control group with egg yolk but no galacto-oligosaccharide, semen was diluted with the diluent described in Patent Document 1, produced and sold by Livestock Improvement Association of Japan for preparation of frozen semen, the diluent having a final glycerin concentration of 6.5% (E control). Semen was diluted with each of these diluents so that the diluted semen contained 80 million sperm per ml. The secondary diluent was added to each primarily diluted semen solution at a ratio of 1:1 so that the diluted semen contained 40 million sperm per ml. Straws for artificial insemination were prepared by conventional methods. Cryopreservation was performed using liquid nitrogen by conventional methods. The content of each of the artificial insemination straws was thawed by conventional methods, and all of the content was transferred to a tube. After having been stirred well, the semen was subjected to centrifugal washing at 2000 rpm for 5 minutes at room temperature, using a sperm washing liquid described in Patent Document 1. The centrifugal washing was performed twice. The quality of the semen was then examined.

Figure 4A:
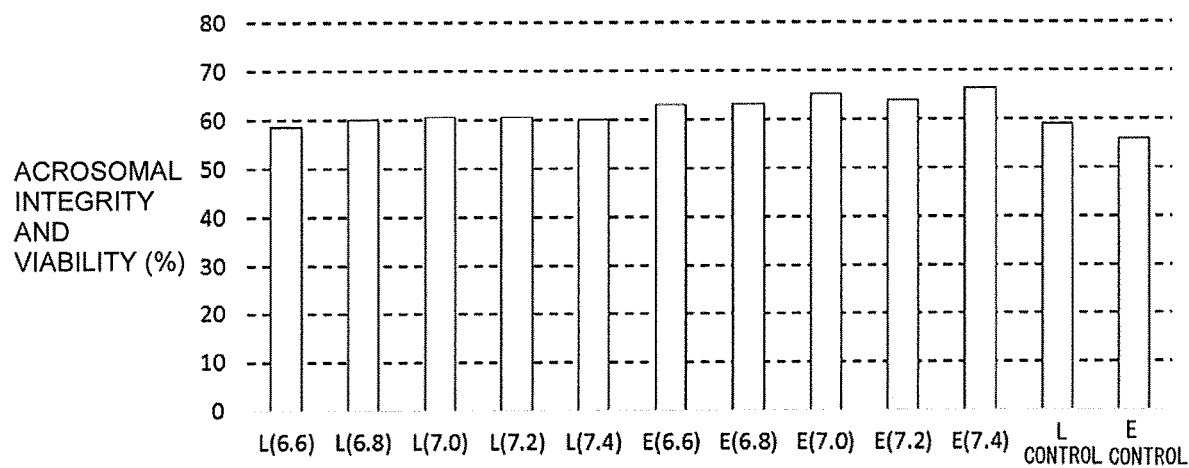
FIG. 4A is a graph showing acrosomal integrity and viability of thawed bovine sperm, wherein the bovine sperm was cryopreserved after being diluted with a respective diluent containing a galacto-oligosaccharide and having a different pH (within the range of from 6.6 to 7.4). The shown values represent average values (n=8).
Figure 4B:
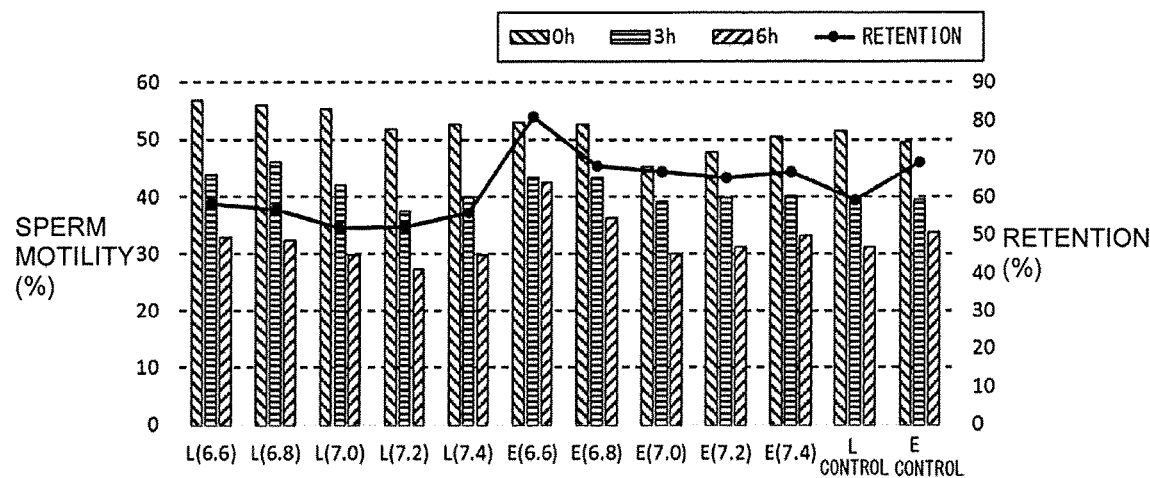
FIG. 4B is a graph showing sperm motility and retention of thawed bovine sperm, wherein the bovine sperm was cryopreserved after being diluted with a respective diluent containing a galacto-oligosaccharide and having a different pH (within the range of from 6.6 to 7.4). The shown values represent average values (n=8).
Figure 4C:
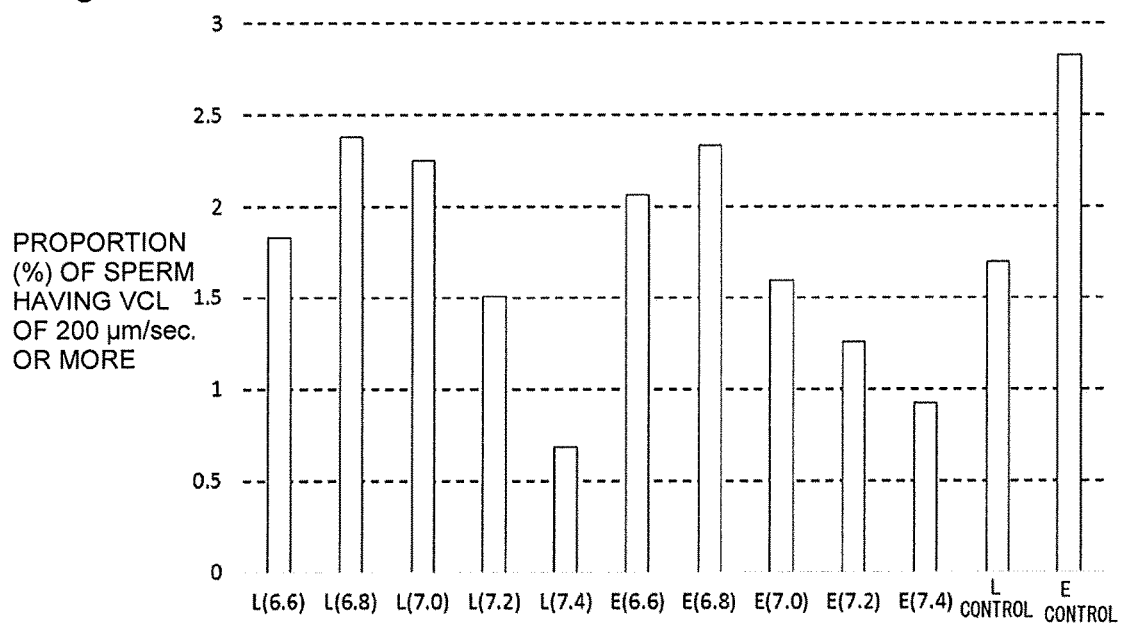

The proportion of viable sperm having acrosomal integrity (FIG. 4A), sperm motility (FIG. 4B), and sperm highly correlating with fertility (FIG. 4C) were examined in the same manner as in Example 3. The test groups with the diluents containing galacto-oligosaccharide showed values equivalent to or higher than those of the control groups. In particular, the proportion of viable sperm having acrosomal integrity was high in all the groups. Use of soybean lecithin resulted in high sperm motility.

Example 7. Influence of Variation in pH of Diluent on Quality of Thawed Semen

Semen collected from a breeding bull kept at Livestock Improvement Association of Japan was diluted with the primary and secondary diluents of Example 1 described above, of which the pH was adjusted to from 5.6 to 7.4 in 0.2 increments by using acid or alkali, so that the final concentration of glycerin was 7%, thereby obtaining diluted sperm solutions. As a control group with no fructo-oligosaccharide, semen was diluted with a diluent described in Example 1 of Patent Document 4, the diluent having a final glycerin concentration of 7%. Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were prepared by conventional methods. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. The quality of the semen was examined.

Figure 5A:
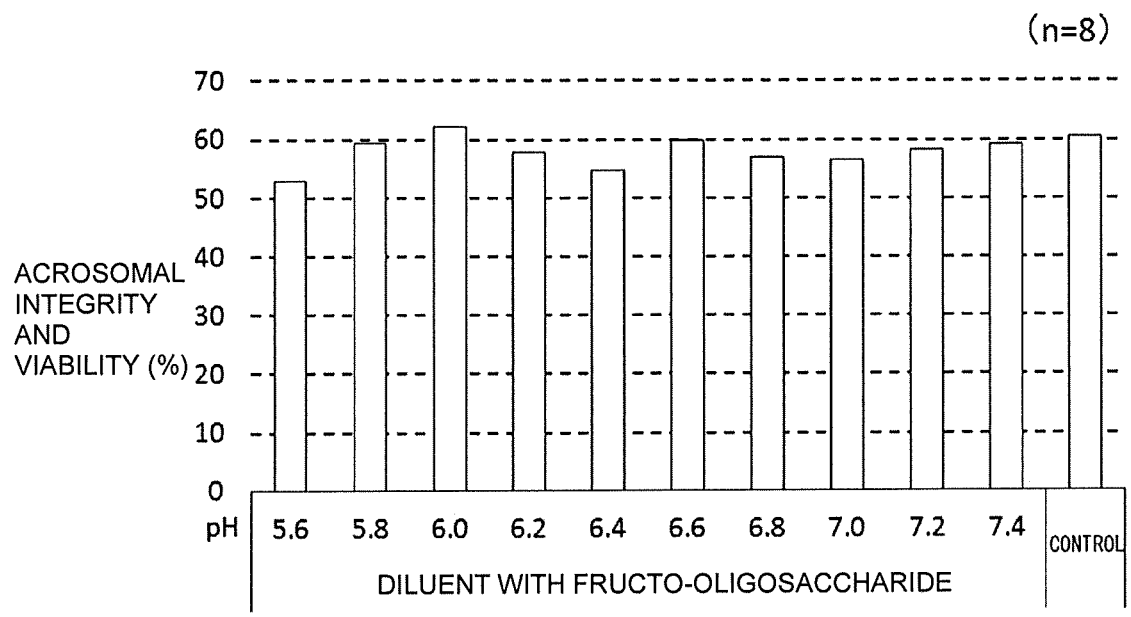
FIG. 5A is a graph showing acrosomal integrity and viability of thawed bovine sperm, wherein the bovine sperm was cryopreserved after being diluted with a respective diluent containing a fructo-oligosaccharide and having a different pH (within the range of from 5.6 to 7.4). The shown values represent average values (n=8).
Figure 5B:
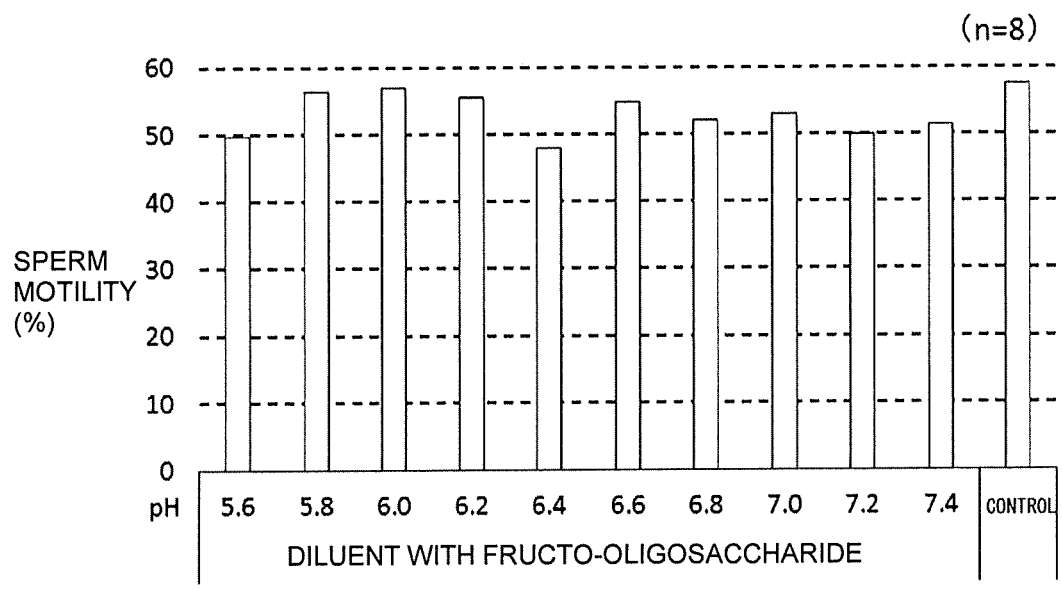
FIG. 5B is a graph showing sperm motility of thawed bovine sperm, wherein the bovine sperm was cryopreserved after being diluted with a respective diluent containing a fructo-oligosaccharide and having a different pH (within the range of from 5.6 to 7.4). The shown values represent average values (n=8).
Figure 5C:
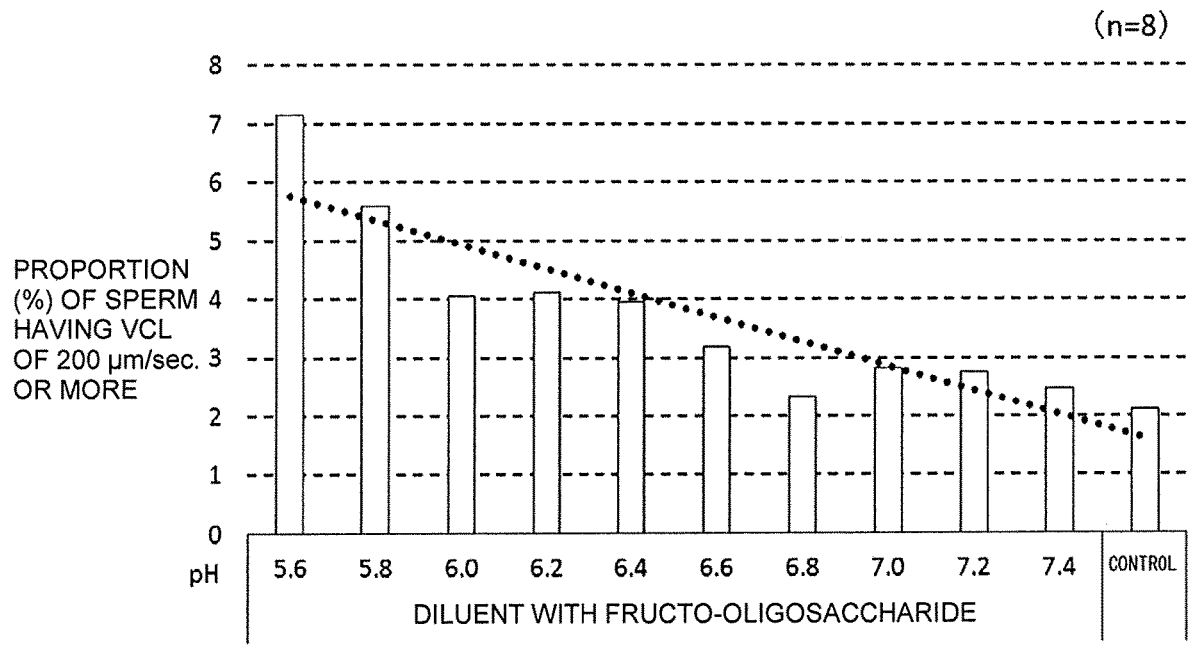
FIG. 5C is a graph showing a proportion of bovine sperm having a VCL of 200 μm/sec. or more with respect to thawed bovine sperm, wherein the bovine sperm was cryopreserved after being diluted with a respective diluent containing a fructo-oligosaccharide and having a different pH (within the range of from 5.6 to 7.4). The shown values represent average values (n=8). It is shown that the proportion of sperm having a VCL of 200 μm/sec. or more increases as the pH of the diluent decreases.

The proportion of viable sperm having acrosomal integrity (FIG. 5A), sperm motility (FIG. 5B), and sperm highly correlating with fertility (FIG. 5C) were examined in the same manner as in Example 3. The test groups with the diluents containing fructo-oligosaccharide showed values equivalent to or higher than those of the control group. In particular, as indicated by the approximation line (indicated by the dotted line), the proportion of sperm having a VCL of 200 μm/sec. or more increased as pH decreased. The examination on sperm highly correlating with fertility showed that the thawed sperm was likely to be agglutinated in the groups with a pH of 5.6 and a pH of 5.8.

Example 8. Influence of Variation in Oligosaccharide Concentration in Diluent on Quality of Thawed Semen Semen collected from a breeding bull kept at Livestock Improvement Association of Japan was diluted with primary and secondary diluents prepared in the same manner as in Example 1 except that an amount of fructo-oligosaccharide or isomalto-oligosaccharide was adjusted to from 20 to 40 g in 5 g increments. The semen was diluted so that the final concentration of glycerin was 7%. As a control group with neither fructo-oligosaccharide nor isomalto-oligosaccharide, semen was diluted with the diluent described in Example 1 of Patent Document 4, the diluent having a final glycerin concentration of 7%. Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were then prepared by conventional methods. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. The quality of the semen was examined.

Figure 6A:
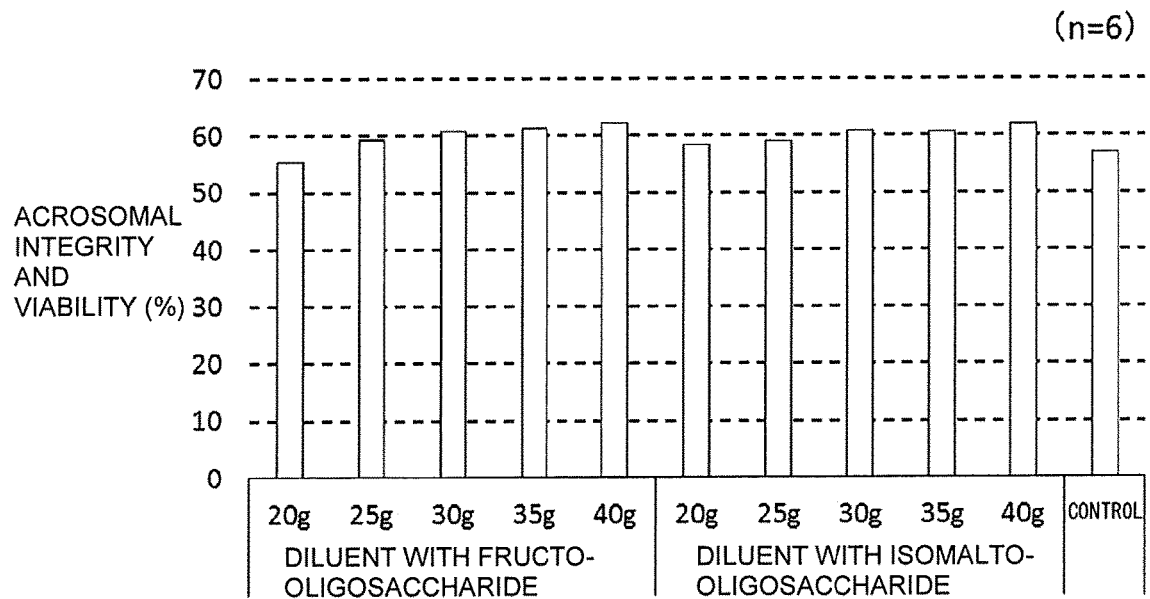
FIG. 6A is a graph showing acrosomal integrity and viability of thawed bovine sperm, wherein the bovine sperm was cryopreserved after being diluted with a respective diluent containing a different amount of a fructo-oligosaccharide or an isomalto-oligosaccharide (within the range of from 20 to 40 g). The shown values represent average values (n=6).
Figure 6B:
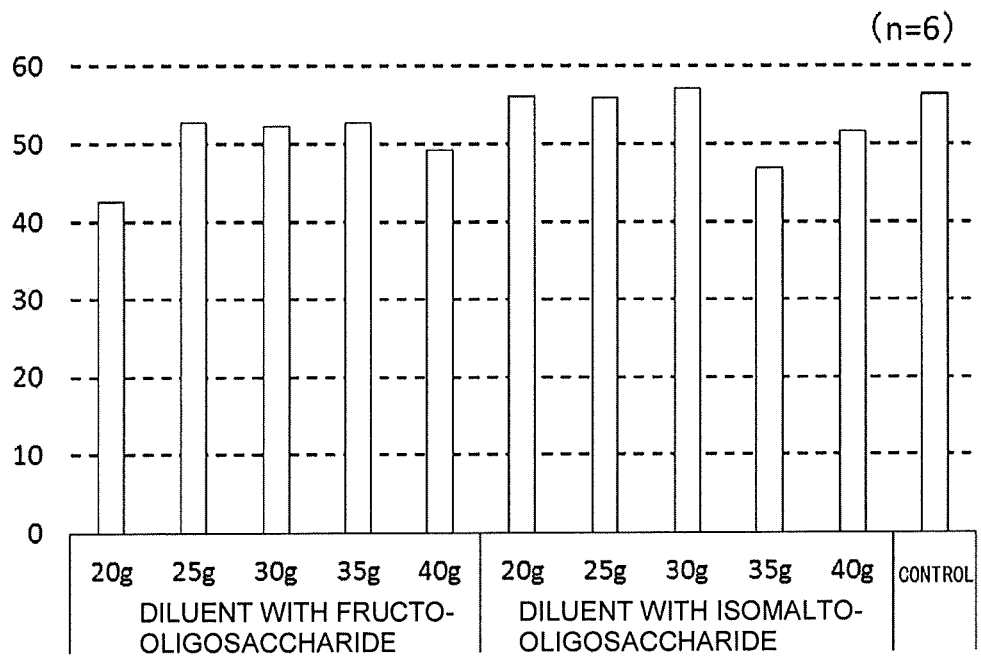
FIG. 6B is a graph showing sperm motility of thawed bovine sperm, wherein the bovine sperm was cryopreserved after being diluted with a respective diluent containing a different amount of a fructo-oligosaccharide or an isomalto-oligosaccharide (within the range of from 20 to 40 g). The shown values represent average values (n=6).
Figure 6C:
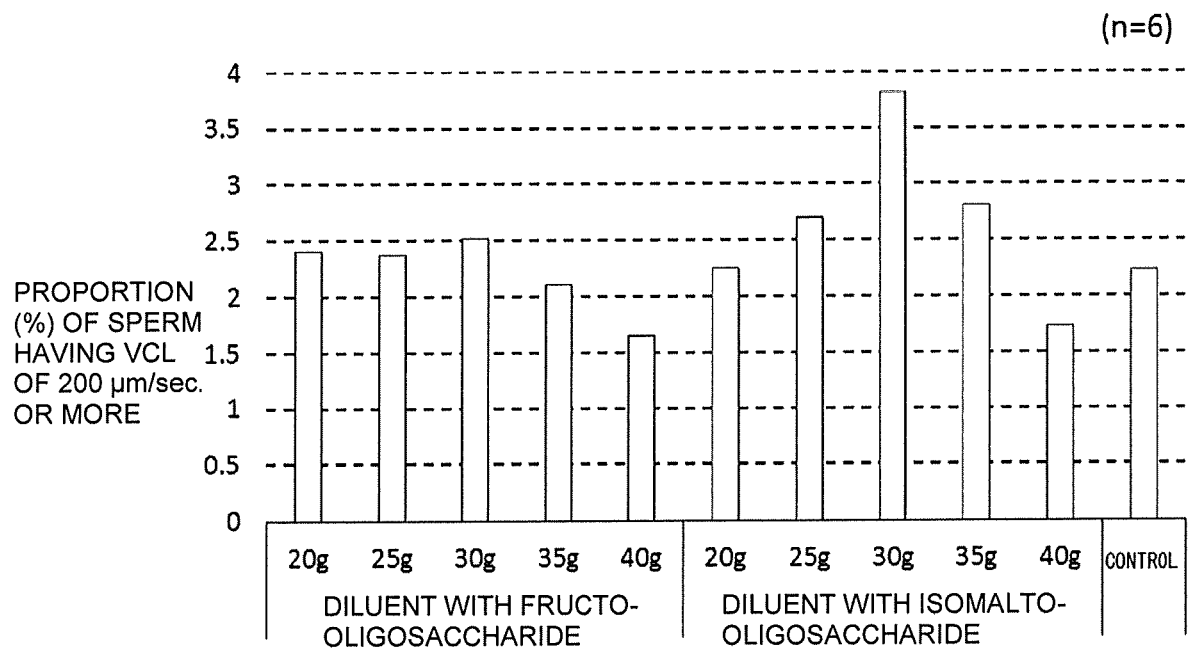
FIG. 6C is a graph showing a proportion of bovine sperm having a VCL of 200 μm/sec. or more with respect to thawed bovine sperm, wherein the bovine sperm was cryopreserved after being diluted with a respective diluent containing a different amount of a fructo-oligosaccharide or an isomalto-oligosaccharide (within the range of from 20 to 40 g). The shown values represent average values (n=6).

The proportion of viable sperm having acrosomal integrity (FIG. 6A), sperm motility (FIG. 6B), and sperm highly correlating with fertility (FIG. 6C) were examined in the same manner as in Example 3. The test groups with the diluents containing fructo-oligosaccharide or isomalto-oligosaccharide showed values equivalent to or higher than those of the control group. In particular, the proportion of viable sperm having acrosomal integrity was high in almost all the groups. The proportion of sperm having a VCL of 200 μm/sec. or more increased in the groups with 20 to 30 g of fructo-oligosaccharide and the groups with 25 to 35 g of isomalto-oligosaccharide.

Example 9. Influence of Oligosaccharide in Diluent on Quality of Thawed Semen

Semen collected from a breeding bull kept at Livestock Improvement Association of Japan was diluted with primary and secondary diluents prepared in the same manner as in Example 1 except that 30 g of fructo-oligosaccharide, a mixture of 15 g of fructo-oligosaccharide and 15 g of isomalto-oligosaccharide, or 30 g of isomalto-oligosaccharide was added. The semen was diluted so that the final concentration of glycerin was 7%. As a control group with neither fructo-oligosaccharide nor isomalto-oligosaccharide, semen was diluted with the diluent described in Patent Document 1, produced and sold by Livestock Improvement Association of Japan for preparation of frozen semen, the diluent having a final glycerin concentration of 6.5%. Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were then prepared by conventional methods. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. Sperm highly correlating with fertility was examined by the method of Example 3.

Figure 7A:
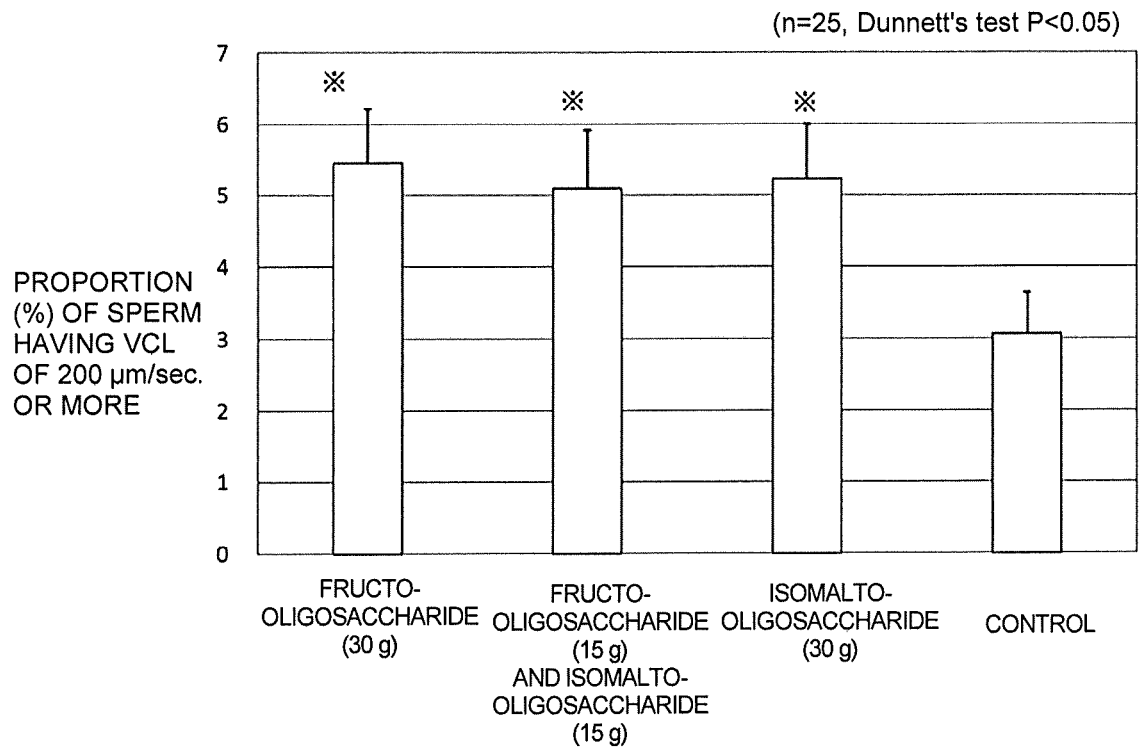
FIG. 7A is a graph showing a proportion of bovine sperm having a VCL of 200 μm/sec. or more with respect to thawed bovine sperm, wherein the bovine sperm was cryopreserved after being diluted with a diluent containing a fructo-oligosaccharide, a mixture of a fructo-oligosaccharide and an isomalto-oligosaccharide, or an isomalto-oligosaccharide. The shown values represent average values and standard error (n=25). It is shown that all of the test groups have an increased proportion of sperm having a VCL of 200 μm/sec. or more, as compared to the control group.
Figure 7B:
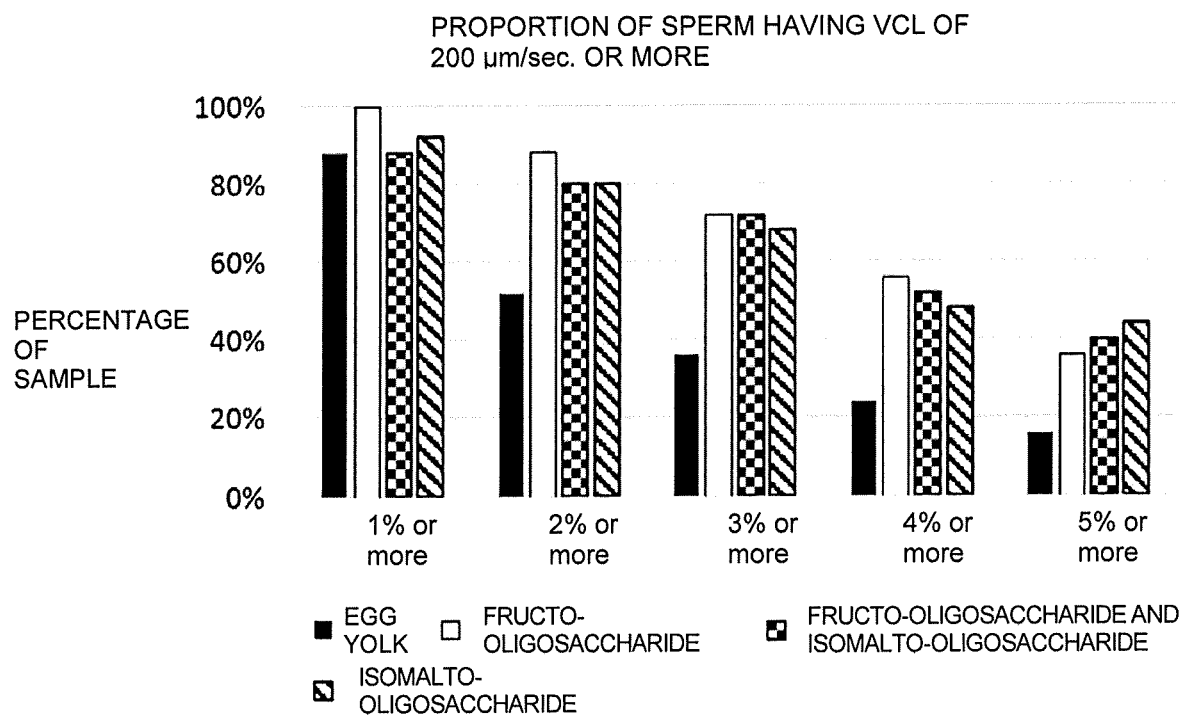
FIG. 7B is a graph showing a percentage of sample wherein bovine sperm having a VCL of 200 μm/sec. or more is at least 1%, at least 2%, at least 3%, at least 4%, or at least 5%, with respect to thawed bovine sperm.

The group with the diluent containing fructo-oligosaccharide, the group with the diluent containing the mixture of fructo-oligosaccharide and isomalto-oligosaccharide, and the group with the diluent containing isomalto-oligosaccharide exhibited a significant increase in the proportion of sperm having a VCL of 200 μm/sec. or more, as compared to the control group (FIG. 7A). In particular, the test group with the diluent containing fructo-oligosaccharide and the test group with the diluent containing the mixture of fructo-oligosaccharide and isomalto-oligosaccharide showed high percentage of samples wherein a proportion of sperm having a VCL of 200 μm/sec. or more is 2% or more, as compared with the control group (FIG. 7B).

Example 10. Influence of Layer Structure in Straw on Quality of Thawed Semen in Oligosaccharide Diluent Semen collected from a breeding bull kept at Livestock Improvement Association of Japan was diluted with primary and secondary diluents prepared in the same manner as in Example 1 except that an amount of fructo-oligosaccharide was adjusted to 30 g. The semen was diluted so that the final concentration of glycerin was 7%. As a control group with neither fructo-oligosaccharide nor isomalto-oligosaccharide, semen was diluted with the diluent described in Patent Document 1, produced and sold by Livestock Improvement Association of Japan for preparation of frozen semen, the diluent having a final glycerin concentration of 6.5%. Semen was diluted with each of the primary diluents so that the diluted semen contained 80 million sperm per ml. The second diluent was added to the primarily diluted semen at a ratio of 1:1 so that the semen contained 40 million sperm per ml. Using the obtained diluted sperm solutions, artificial insemination straws having a one-layer structure or a two-layer structure were prepared in accordance with the description of Patent Document 1. Cryopreservation was performed using liquid nitrogen by conventional methods. The content of each of the artificial insemination straws was thawed by conventional methods, and all of the content was transferred to a tube (Thermo SCIENTIFIC Inc., 509-GRD-Q). After having been stirred well, the semen was subjected to centrifugal washing at 2000 rpm for 5 minutes at room temperature, using a sperm washing liquid described in Patent Document 1. The centrifugal washing was performed twice. Sperm highly correlating with fertility was examined by the method of Example 3.

Figure 8A:
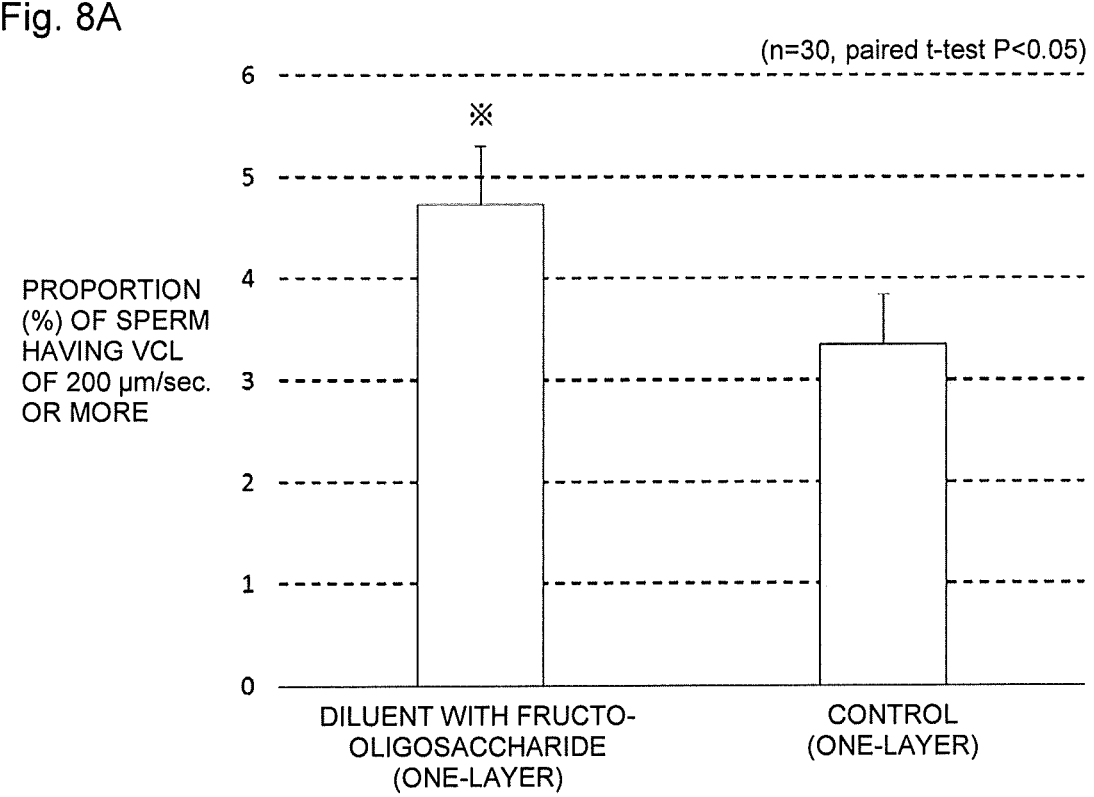
FIG. 8A is a graph showing a proportion of bovine sperm having a VCL of 200 μm/sec. or more with respect to thawed bovine sperm, wherein the bovine sperm was cryopreserved after being diluted with a diluent containing a fructo-oligosaccharide to form a one-layer structure in a straw. The shown values represent average values and standard error (n=30). It is shown that the test group has an increased proportion of sperm having a VCL of 200 μm/sec. or more, as compared to the control group.
Figure 8B:
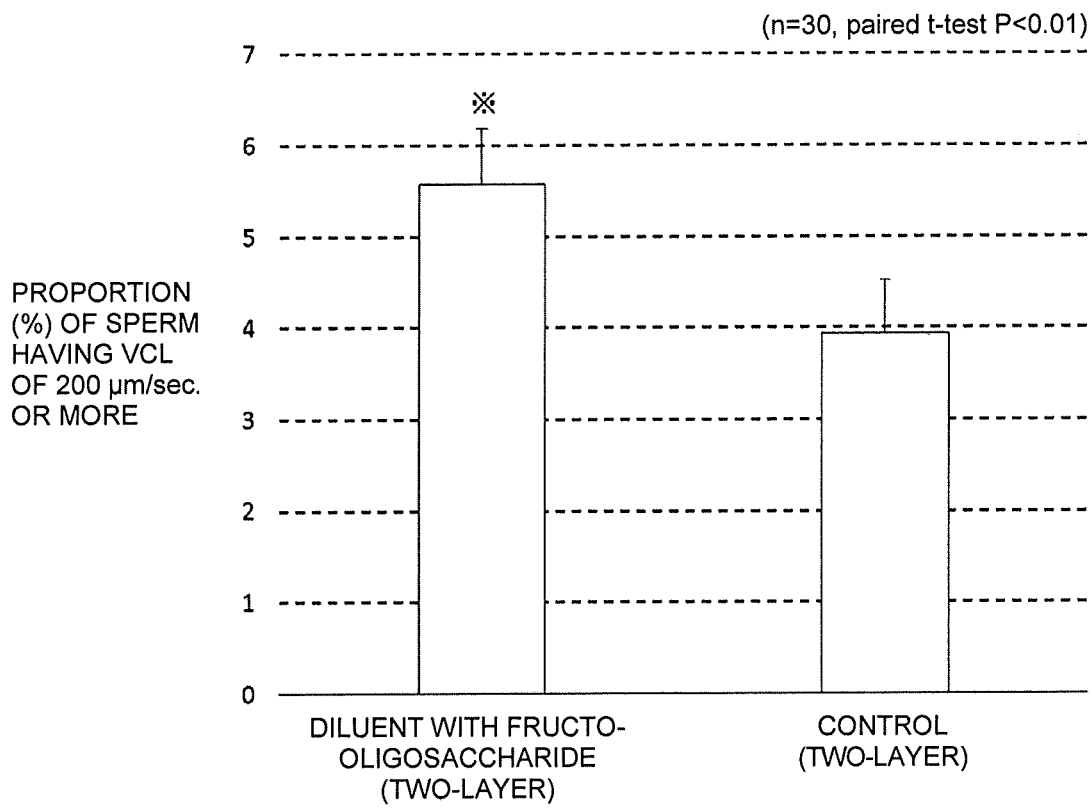
FIG. 8B is a graph showing a proportion of bovine sperm having a VCL of 200 μm/sec. or more with respect to thawed bovine sperm, wherein the bovine sperm was cryopreserved after being diluted with a diluent containing a fructo-oligosaccharide to form a two-layer structure in a straw. The shown values represent average values and standard error and standard error (n=30). It is shown that the test group has an increased proportion of sperm having a VCL of 200 μm/sec. or more, as compared to the control group.
Figure 8C:
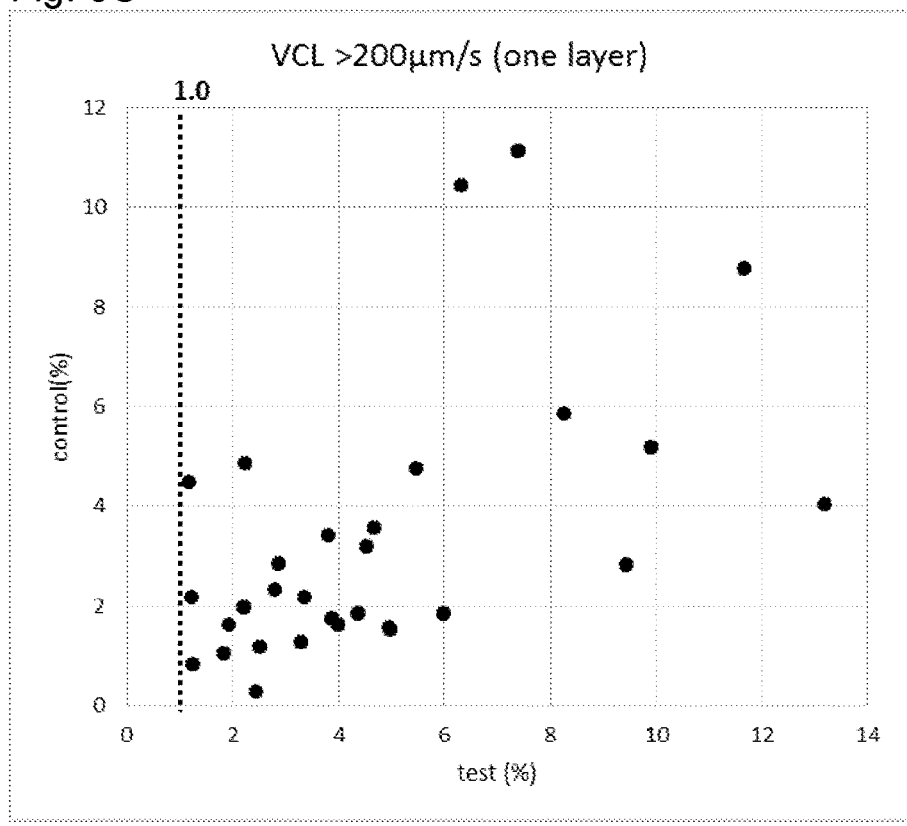
FIG. 8C is a scatter diagram showing a proportion of bovine sperm having a VCL of 200 μm/sec. or more, obtained by using straws having a one-layer structure.
Figure 8D:
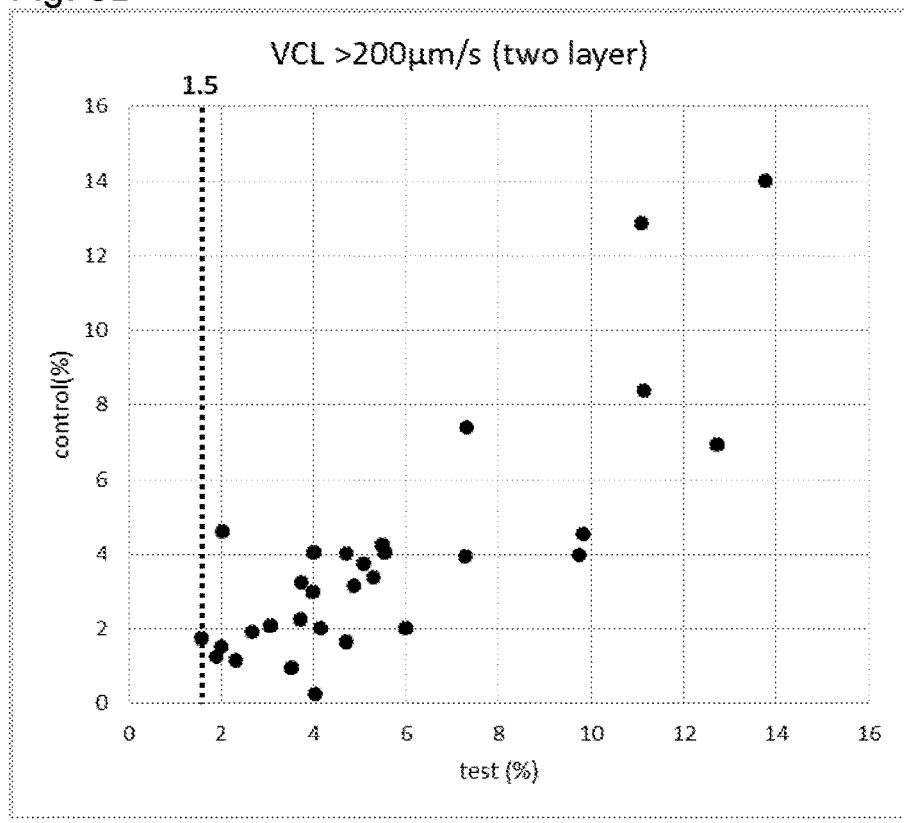
FIG. 8D is a scatter diagram showing a proportion of bovine sperm having a VCL of 200 μm/sec. or more, obtained by using straws having a two-layer structure.

With the diluent containing fructo-oligosaccharide, the one-layer type (FIG. 8A) and the two-layer type (FIG. 8B) both exhibited a significant increase in the proportion of sperm having a VCL of 200 μm/sec. or more, compared to the control groups. FIG. 8C is a scatter diagram showing a proportion of bovine sperm having a VCL of 200 μm/sec. or more, in the case of using the diluent containing fructo-oligosaccharide and the one-layer type straw. The test groups did not show a proportion lower than 1.0%. FIG. 8D is a scatter diagram showing a proportion of bovine sperm having a VCL of 200 μm/sec. or more, in the case of using the diluent containing fructo-oligosaccharide and the two-layer type straw. The test groups did not show a proportion lower than 1.5%. These results indicate that the test groups show significant improvement in a proportion of bovine sperm having a VCL of 200 μm/sec. or more, as compared with the control groups.

Example 11. Result of In-Vitro Fertilization of Frozen Semen Prepared by Using Oligosaccharide Diluent Semen collected from a breeding bull kept at Livestock Improvement Association of Japan was diluted with primary and secondary diluents prepared in the same manner as in Example 1 except that 30 g of fructo-oligosaccharide or 30 g of isomalto-oligosaccharide was added. The semen was diluted so that the final concentration of glycerin was 7%, thereby obtaining diluted sperm solutions. As a control group with soybean lecithin and devoid of fructo-oligosaccharide and isomalto-oligosaccharide, semen was diluted with the diluent described in Example 1 of Patent Document 4, the diluent having a final glycerin concentration of 7%. As a control group with egg yolk and devoid of fructo-oligosaccharide and isomalto-oligosaccharide, semen was diluted with the diluent described in Patent Document 1, produced and sold by Livestock Improvement Association of Japan for preparation of frozen semen, the diluent having a final glycerin concentration of 6.5%. Semen was diluted with each of these diluents so that the diluted semen contained 80 million sperm per ml. The second diluent was added to the primarily diluted semen at a ratio of 1:1 so that the semen contained 40 million sperm per ml. Straws for artificial insemination were then prepared by conventional methods. Cryopreservation was performed using liquid nitrogen by conventional methods. The cryopreserved semen of each group was thawed by conventional methods, and in-vitro fertilization test was conducted by conventional methods to measure a normal fertilization rate, a 2-cell rate, an 8-cell rate, and a blastocyst rate.

Each test group with the diluent containing fructo-oligosaccharide or isomalto-oligosaccharide showed values equivalent to or higher than those of the control groups, demonstrating that fructo-oligosaccharide and isomalto-oligosaccharide have substantially no adverse influence on the oocyte penetration ability of sperm and the development ability of fertilized embryo (FIG. 9).

Example 12. Conception Rate of Artificial Insemination of Frozen Semen Prepared by Using Diluent Containing Oligosaccharide of Present Invention Semen collected from two dairy bulls and one beef bull kept at Livestock Improvement Association of Japan was diluted with the primary diluent of Example 1 and the secondary diluent prepared by adding glycerin to the primary diluent, so that the diluted semen contained 20 million sperm per straw, and the final concentration of glycerin was 7.0%, thereby preparing a diluted sperm solution (test group). As a control group, semen was diluted with the diluent described in Patent Document 1, produced and sold by Livestock Improvement Association of Japan for preparation of frozen semen, the diluent having a final glycerin concentration of 6.5%. Straws for artificial insemination having a two-layer structure were prepared according to Patent Document 1, and freezing was carried out by using liquid nitrogen in accordance with conventional methods. After being thawed by conventional methods, each artificial insemination straw was charged in an injector. Then, artificial insemination was performed on obviously estrous cows. Conception was confirmed by the non-return method or fetal membrane palpation (60 days), thereby measured a conception rate.

Figure 10:
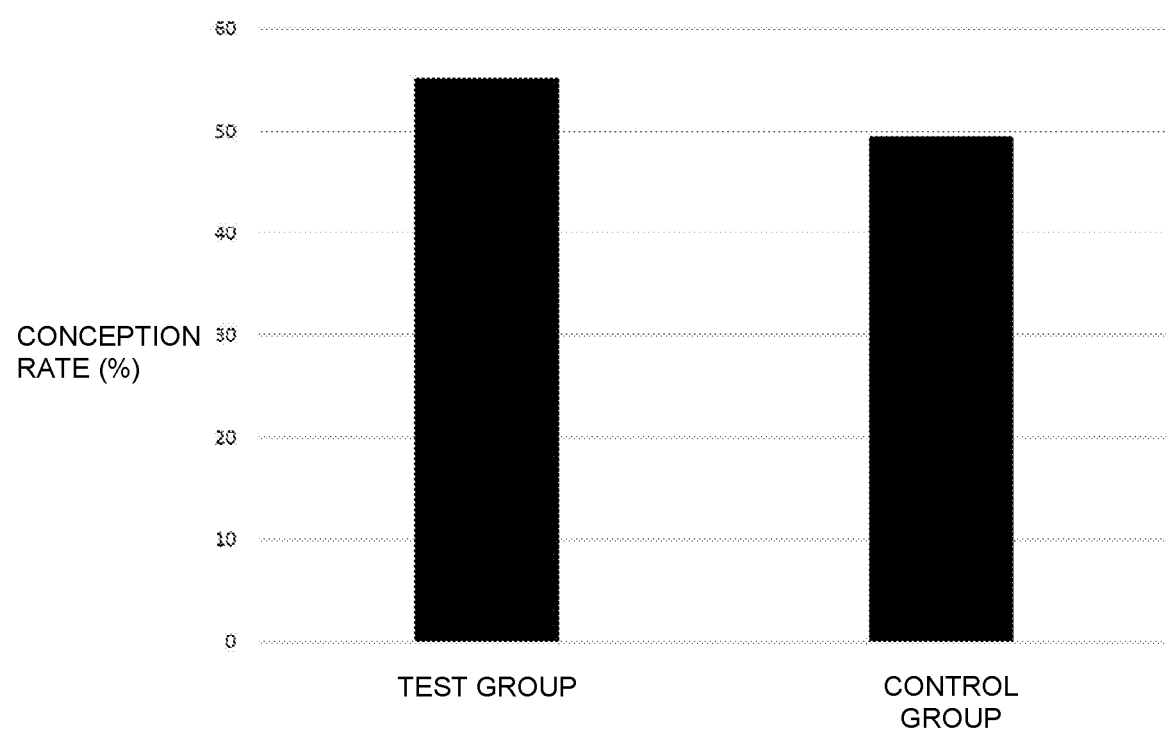
FIG. 10 is a graph showing a conception rate of thawed bovine sperm in an artificial insemination test, wherein the bovine sperm was cryopreserved after being diluted with a diluent containing a fructo-oligosaccharide. It is shown that the test group has an improved conception rate, as compared to the control group.

The average conception rate of the three breeding bulls was 55.1% (138 cows inseminated) in the test group, and 49.5% (134 cows inseminated) in the control group. The test group was superior to the control group in the conception rate (FIG. 10). Depending on the breeding bulls, some cows in the test group exhibited a notable increase in the conception rate. It is expected that the diluent for sperm of the present invention improves the conception rate of a breeding bull showing a low conception rate with the use of a conventional diluent. The cows of both the test group and the control group had normal deliveries. The diluent of the test group had substantially no adverse influence on the fetuses and mothers.

Table 2 below shows the result of quality evaluation of the frozen semen used in the artificial insemination. The quality of semen of the test groups is generally better than that of the control groups in all of the evaluation criteria: elite sperm rate (a proportion of sperm having a VCL of 200 μm/sec. or more), sperm motility, rate of acrosomal integrity and viability, and rate of high mitochondrial activity.

TABLE 2

| Code of breeding bull | Birth date | Type of group | Elite sperm rate (%) | Sperm motility 0 hour | Sperm motility 6 hours | Retention (%) | Rate of viability and acrosomal integrity (%) | Rate of high mitochondrial activity (%) |
|---|---|---|---|---|---|---|---|---|
| A | Sep. 7, 2015 | Test group | 7.6 | 61 | 57 | 93.4 | 70.1 | 69.5 |
|  |  | Control group | 5.8 | 59 | 52 | 88.1 | 70.9 | 68.0 |
| B | Sep. 17, 2015 | Test group | 3.8 | 73 | 51 | 69.9 | 80.2 | 76.5 |
|  |  | Control group | 2.6 | 70 | 31 | 44.3 | 78.1 | 75.8 |
| C | Sep. 14, 2015 | Test group | 8.1 | 63 | 53 | 84.1 | 68.1 | 62.9 |
|  |  | Control group | 7.1 | 63 | 49 | 77.8 | 68.1 | 65.1 |

INDUSTRIAL APPLICABILITY

The diluent for sperm according to present invention, which contains at least one oligosaccharide selected from the group consisting of a fructo-oligosaccharide, an isomalto-oligosaccharide, a gentio-oligosaccharide and a galacto-oligosaccharide, can improve quality of sperm and provide sperm having high fertility. The present invention contributes to efficient production of calves in the field. In addition, the diluent of the present invention can be prepared at a lower cost than the diluents of the known art, reducing costs for preservation of sperm.

This application is a continuation of PCT Application No. PCT/JP2017/010439, filed on Mar. 15, 2017, which is based upon and claims the benefit of priority from Japanese Patent Application No. 2016-052899 filed on Mar. 16, 2016. The contents of those applications are incorporated herein by reference in their entireties.

What is claimed is:

1. A diluted sperm solution, comprising a diluent and a bovine sperm,
the diluent comprising:
an aqueous solution which comprises at least one oligosaccharide selected from the group consisting of a fructo-oligosaccharide, an isomalto-oligosaccharide, a gentio-oligosaccharide and a galacto-oligosaccharide;
soybean lecithin;
a cryoprotectant comprising glycerin;
a buffer comprising tris(hydroxymethyl)aminomethane, citric acid, or both; and
a sugar comprising fructose, lactose, or both; and
wherein:
the aqueous solution has a pH of from 6.2 to 7.0;
a concentration of the oligosaccharide in the diluent is from 25 to 35 g/L (w/v); and
a concentration of glycerin in the diluent is from 6.0 to 8.0% (v/v).

2. The diluted sperm solution according to claim 1, wherein a concentration of the soybean lecithin in the diluent is from 0.15 to 1.0% (w/v).

3. The diluted sperm solution according to claim 2, wherein the aqueous solution has a pH of from 6.4 to 6.8.

4. The diluted sperm solution according to claim 3, wherein the buffer comprises tris(hydroxymethyl)aminomethane and citric acid.

5. The diluted sperm solution according to claim 4, wherein a concentration of tris(hydroxymethyl)aminomethane in the diluent is from 50 to 200 mM, and a concentration of citric acid in the diluent is from 20 to 80 mM.

6. The diluted sperm solution according to claim 5, the sugar comprises fructose and lactose.

7. The diluted sperm solution according to claim 6, wherein a concentration of fructose is from 1 to 50 mM, and a concentration of lactose is from 1 to 100 mM.

8. The diluted sperm solution according to claim 5, wherein the aqueous solution comprises a fructo-oligosaccharide, an isomalto-oligosaccharide, or both.

9. The diluted sperm solution according to claim 1, wherein, when the diluted sperm solution is frozen and then thawed to obtain a preserved sperm solution, a proportion of sperm having a curvilinear velocity (VCL) of 200 μm/second or more is at least 1% with respect to a total amount of the sperm in the preserved sperm solution.

10. The diluted sperm solution according to claim 9, wherein the proportion of the sperm having the curvilinear velocity (VCL) of 200 μm/second or more is at least 1.5% with respect to the total amount of the sperm in the preserved sperm solution.

11. The diluted sperm solution according to claim 1, wherein:
the oligosaccharide comprises the fructo-oligosaccharide; and
the fructo-oligosaccharide comprises the 1-kestose, nystose or 1-fructofuranosyl nystose.

12. The diluted sperm solution according to claim 1, wherein:
the oligosaccharide comprises the isomalto-oligosaccharide; and
the isomalto-oligosaccharide comprises isomaltose, isomaltotriose or panose.

13. The diluted sperm solution according to claim 1, wherein the diluent has an osmotic pressure of from 230 to 3414 mmol/kg, as measured with an osmometer.

14. The diluted sperm solution according to claim 1, wherein the concentration of glycerin in the diluent is from 6.0 to 7.5% (v/v).

15. A straw for artificial insemination, the straw comprising:
the diluted sperm solution as defined in claim 1; and a straw.

16. The straw according to claim 15, which has a two-layer structure.

17. The straw according to claim 15, wherein a proportion of sperm having a curvilinear velocity (VCL) of 200 μm/second or more is at least 1% with respect to a total amount of sperm in a thawed sperm, after freezing and thawing the straw.

18. A sperm preservation method, comprising:
refrigerating or freezing the diluted sperm solution of claim 1.

* * * * *